US010341500B2

(12) United States Patent
Nakajima et al.

(10) Patent No.: US 10,341,500 B2
(45) Date of Patent: Jul. 2, 2019

(54) INFORMATION PROCESSING APPARATUS AND IMAGE READING APPARATUS

(71) Applicant: CANON KABUSHIKI KAISHA, Tokyo (JP)

(72) Inventors: Fumika Nakajima, Tokyo (JP); Yushi Oka, Abiko (JP); Asahiro Nakayoshi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 15/822,750

(22) Filed: Nov. 27, 2017

(65) Prior Publication Data

US 2018/0167519 A1    Jun. 14, 2018

(30) Foreign Application Priority Data

Dec. 14, 2016    (JP) ................................ 2016-241828

(51) Int. Cl.
*G06F 9/4401* (2018.01)
*G06F 12/02* (2006.01)
(Continued)

(52) U.S. Cl.
CPC ........... *H04N 1/00013* (2013.01); *G06F 8/71* (2013.01); *G06F 9/4401* (2013.01); *G06F 9/445* (2013.01);
(Continued)

(58) Field of Classification Search
CPC ...... G06F 12/0246; G06F 8/71; G06F 9/4401; G06F 9/445; G06F 1/3026–3231; G06F 1/3296; G06F 1/3293; H04N 1/00; H04N 1/00013; H04N 1/00602; H04N 1/00697; H04N 1/00896; H04N 1/00885–00901
See application file for complete search history.

(56) References Cited

U.S. PATENT DOCUMENTS 6,072,472 A * 6/2000 Shiga ................... G06F 1/3215
341/22
6,256,781 B1 * 7/2001 Okajima ................. G06F 1/24
710/62

(Continued)

FOREIGN PATENT DOCUMENTS

JP    2001-209545    8/2001
JP    2008-065434    3/2008
(Continued)

OTHER PUBLICATIONS

Office Action dated Oct. 16, 2018 in counterpart Japan Application No. 2016-241828, together with English translation thereof.

*Primary Examiner* — Negussie Worku
(74) *Attorney, Agent, or Firm* — Venable LLP

(57) ABSTRACT

Provided is an information processing apparatus including: a non-volatile memory; a volatile memory being configured to store first, second and third programs; and a processor configured to: in a first activation processing mode, transfer the first program from the non-volatile memory to the volatile memory; transfer the second program from the non-volatile memory to the volatile memory based on the stored first program; and parallelly perform, first processing based on the stored second program and transfer of the third program from the non-volatile memory to the volatile memory, and in a second activation processing mode, transfer the first program from the non-volatile memory to the volatile memory; transfer the third program from the non-volatile memory to the volatile memory based on the stored first program; and parallelly perform second processing based on the stored third program and transfer of the second program from the non-volatile memory to the volatile memory.

11 Claims, 17 Drawing Sheets

(51) Int. Cl.
*G06F 8/71* (2018.01)
*G06F 9/445* (2018.01)
*H04N 1/00* (2006.01)

(52) U.S. Cl.
CPC ........... *H04N 1/00* (2013.01); *H04N 1/00602* (2013.01); *G06F 12/0246* (2013.01); *H04N 1/00697* (2013.01); *H04N 1/00896* (2013.01)

(56) References Cited

U.S. PATENT DOCUMENTS

| | | | | |
|---|---|---|---|---|
| 7,457,943 | B2* | 11/2008 | Hiramatsu | G03G 15/5004 |
| | | | | 713/1 |
| 7,890,671 | B2 | 2/2011 | Iwahashi et al. | 710/22 |
| 8,040,567 | B2* | 10/2011 | Hosaka | H04N 1/4057 |
| | | | | 347/5 |
| 8,832,482 | B2* | 9/2014 | Hayashi | G06F 1/3209 |
| | | | | 713/323 |
| 9,317,091 | B2* | 4/2016 | Ueda | G06F 1/263 |
| 2003/0158608 | A1* | 8/2003 | Ishikawa | G06T 1/20 |
| | | | | 700/2 |
| 2014/0132973 | A1* | 5/2014 | Yamashita | H04N 1/00928 |
| | | | | 358/1.13 |
| 2015/0281622 | A1* | 10/2015 | Fujihashi | H04N 5/04 |
| | | | | 348/294 |

FOREIGN PATENT DOCUMENTS

| | | |
|---|---|---|
| JP | 4111649 | 7/2008 |
| JP | 2013-062814 | 4/2013 |
| JP | 2013-097715 | 5/2013 |
| JP | 2013-141751 | 7/2013 |

* cited by examiner

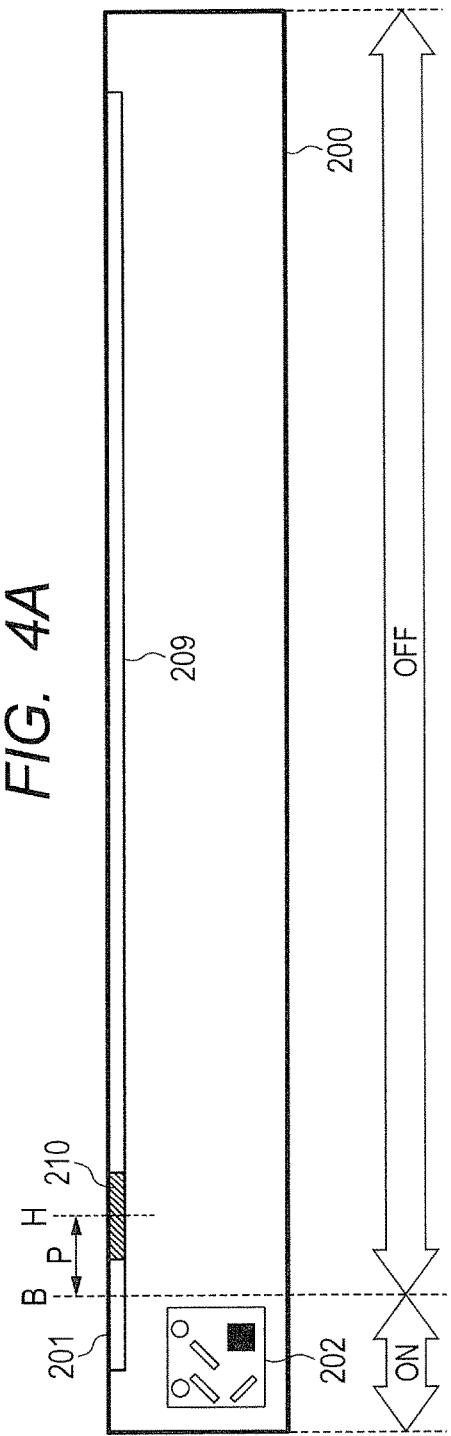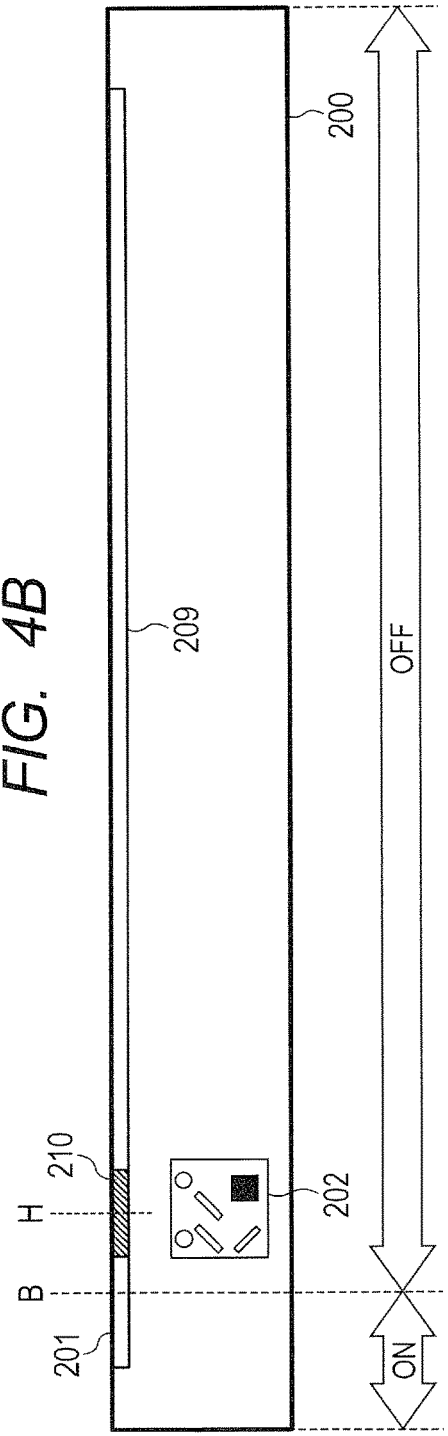

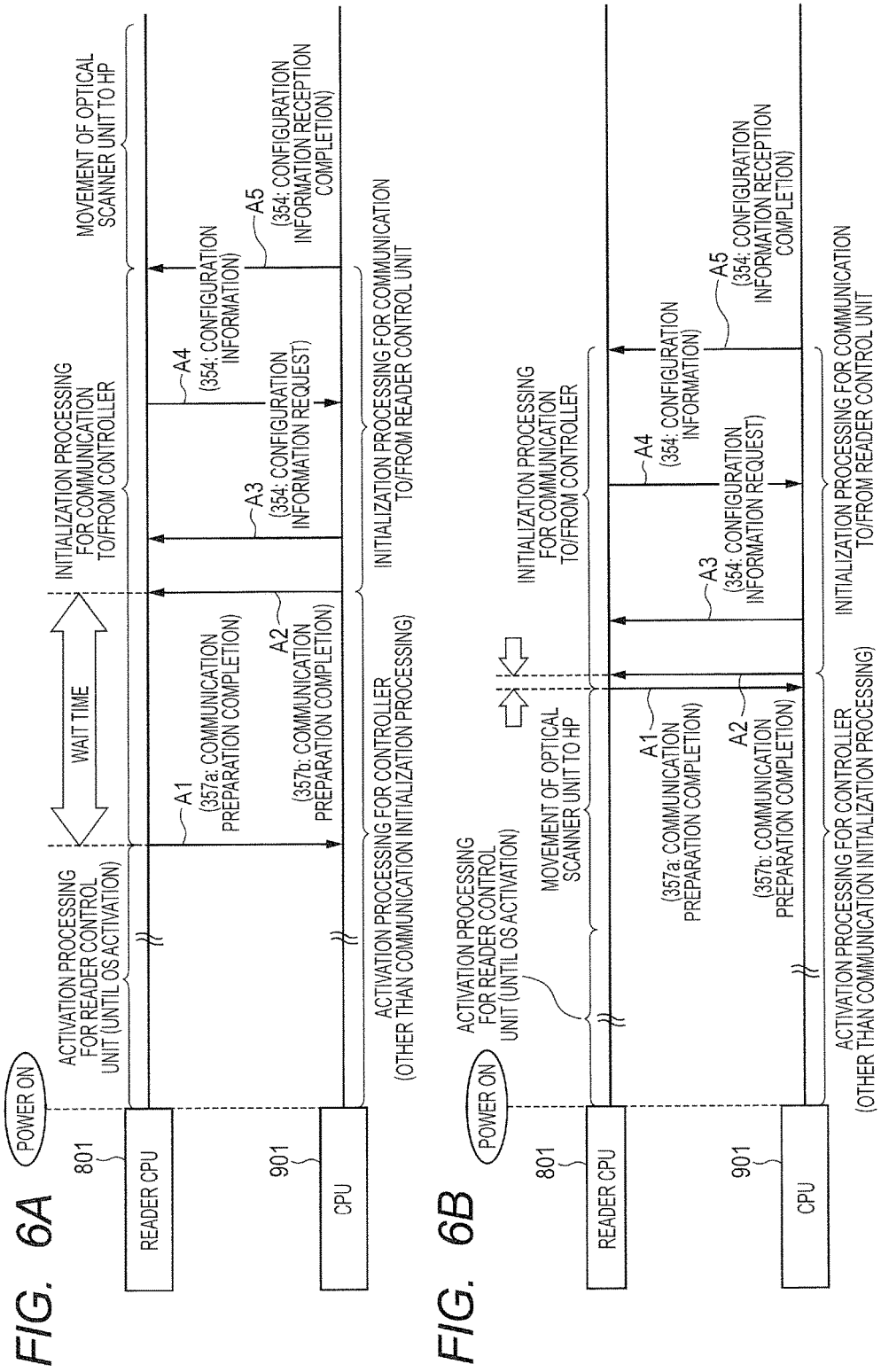

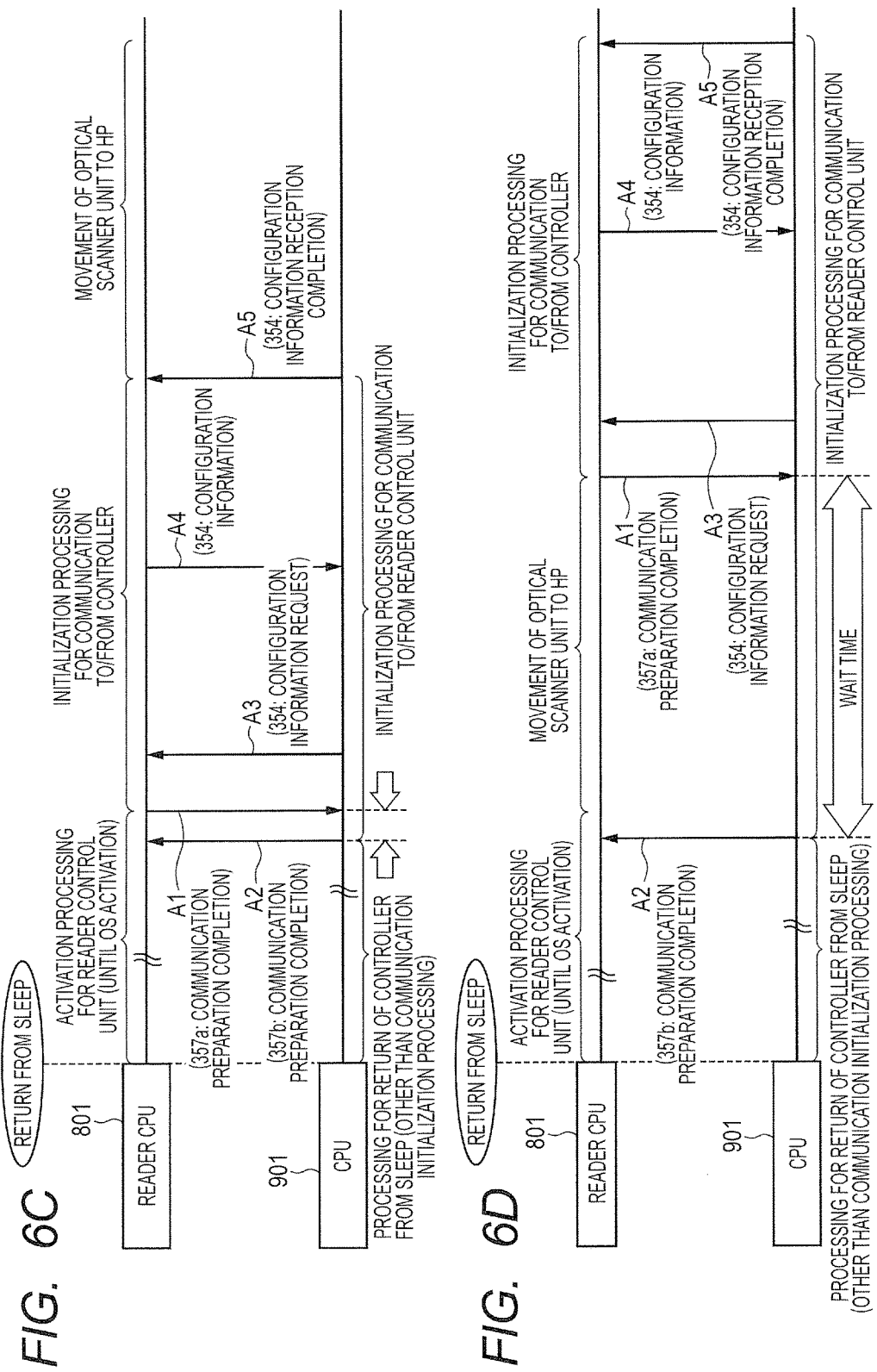

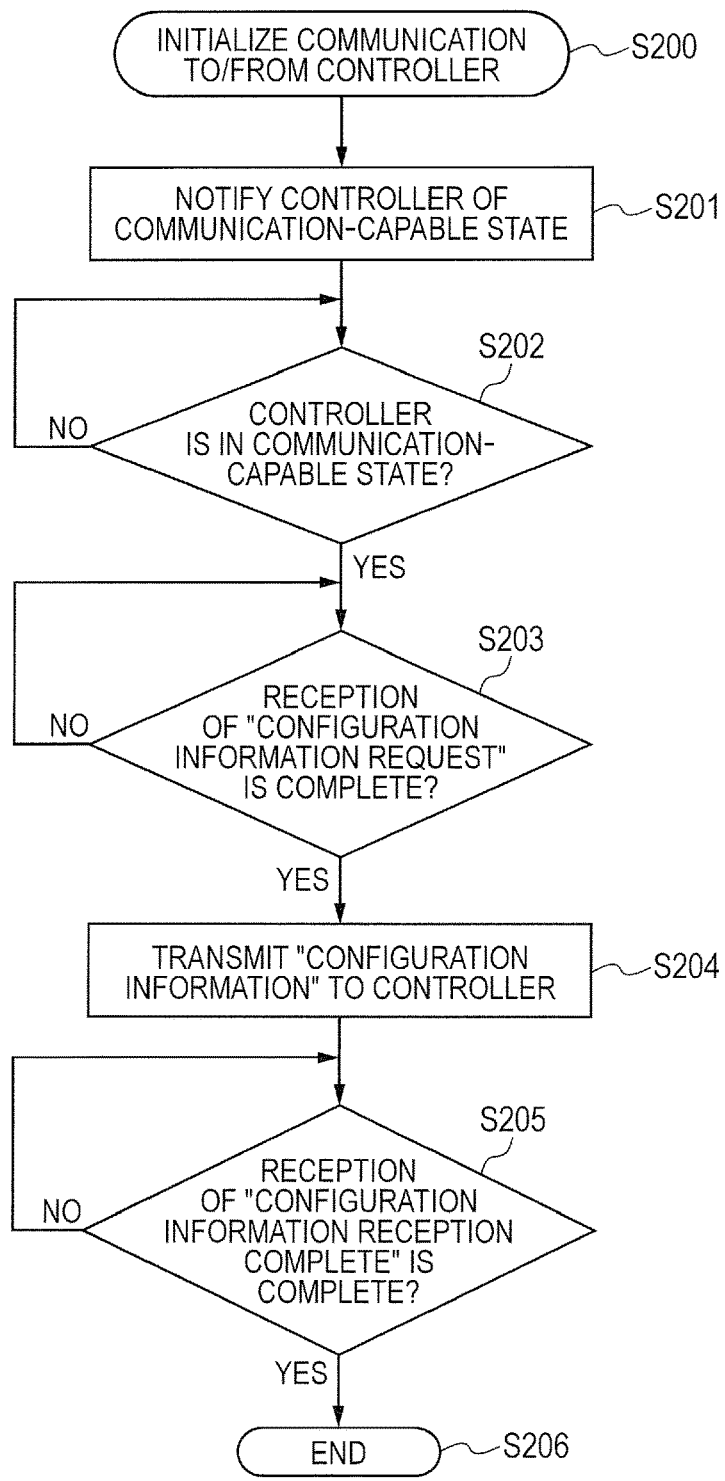

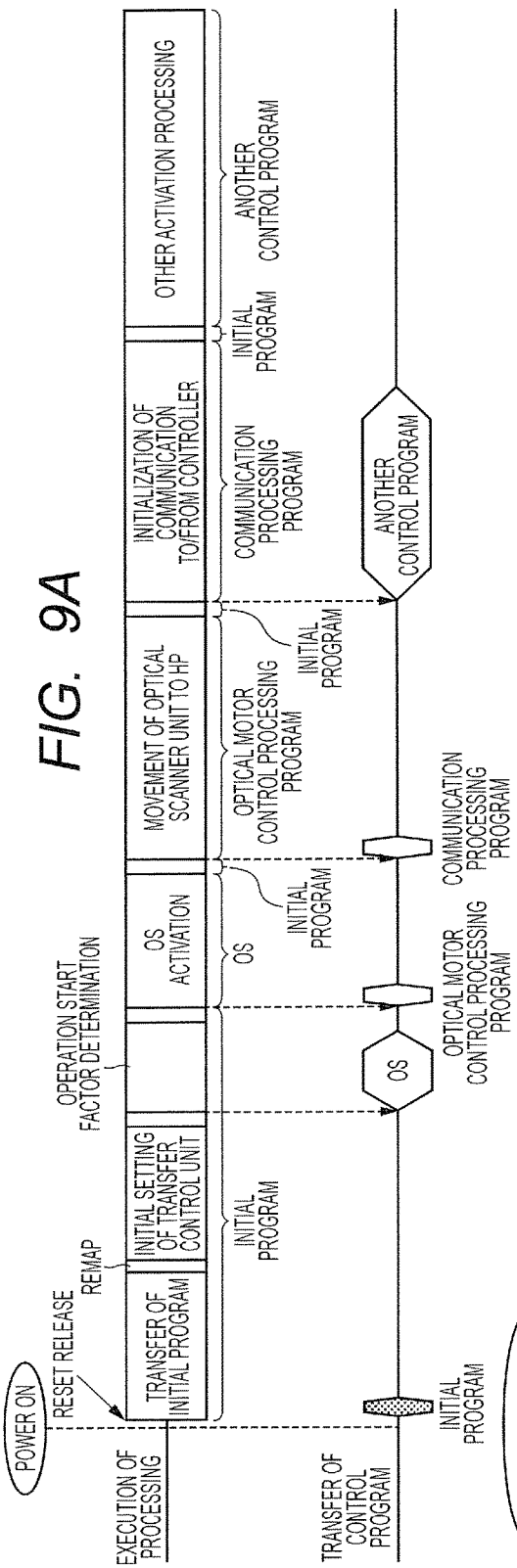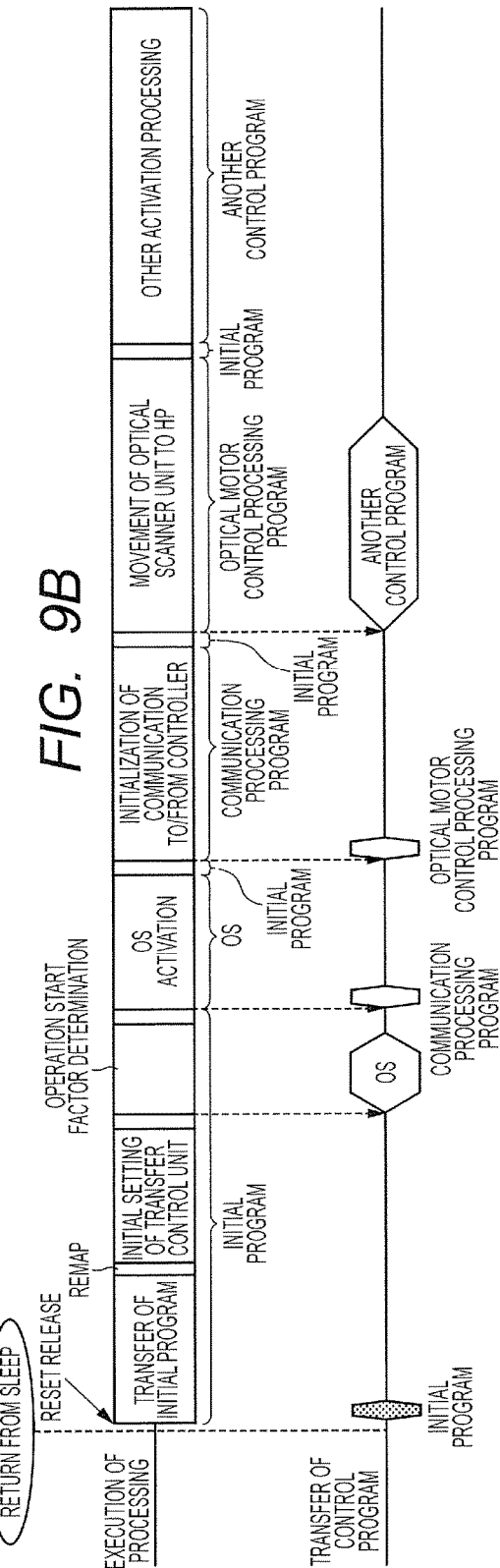

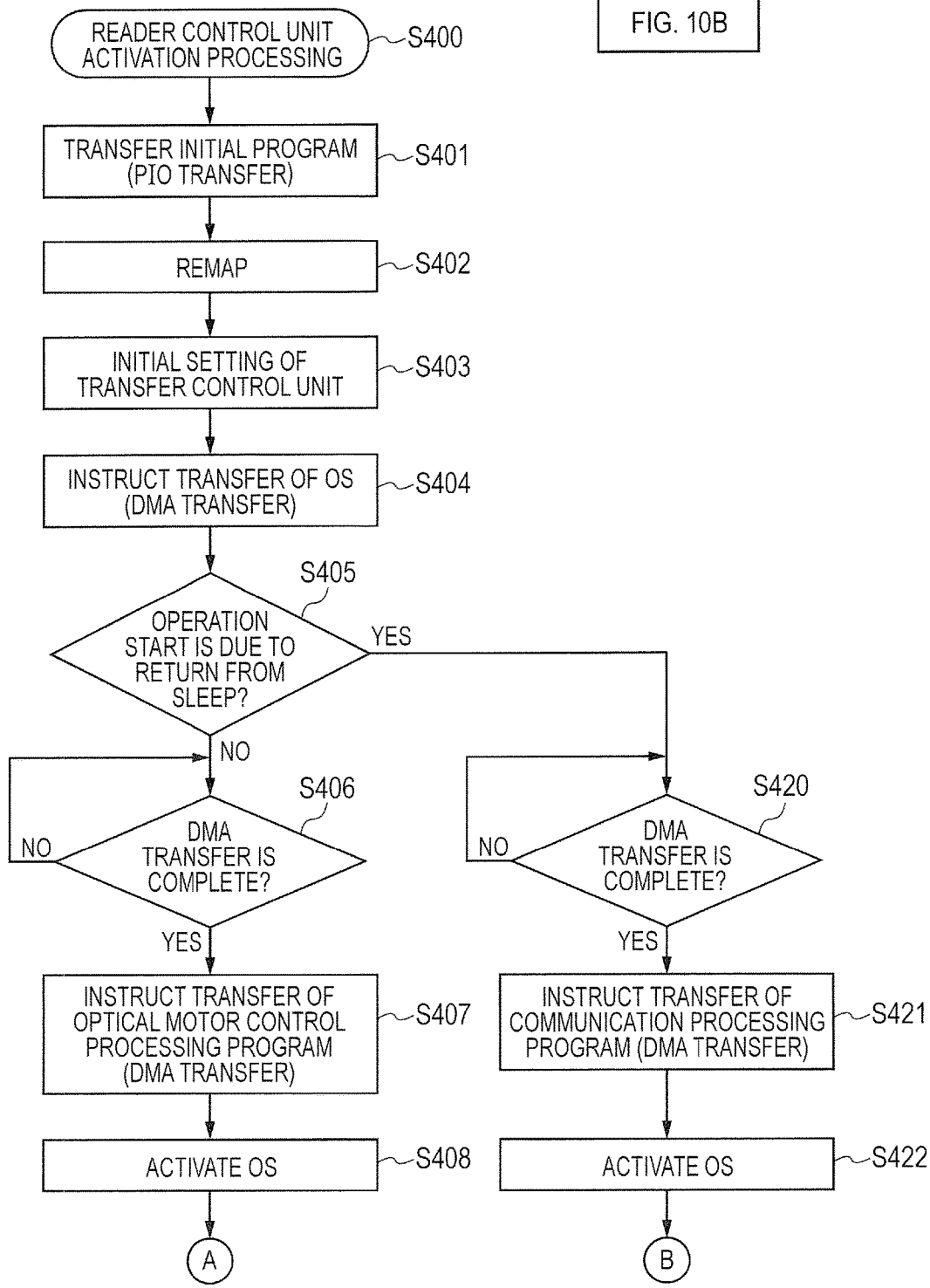

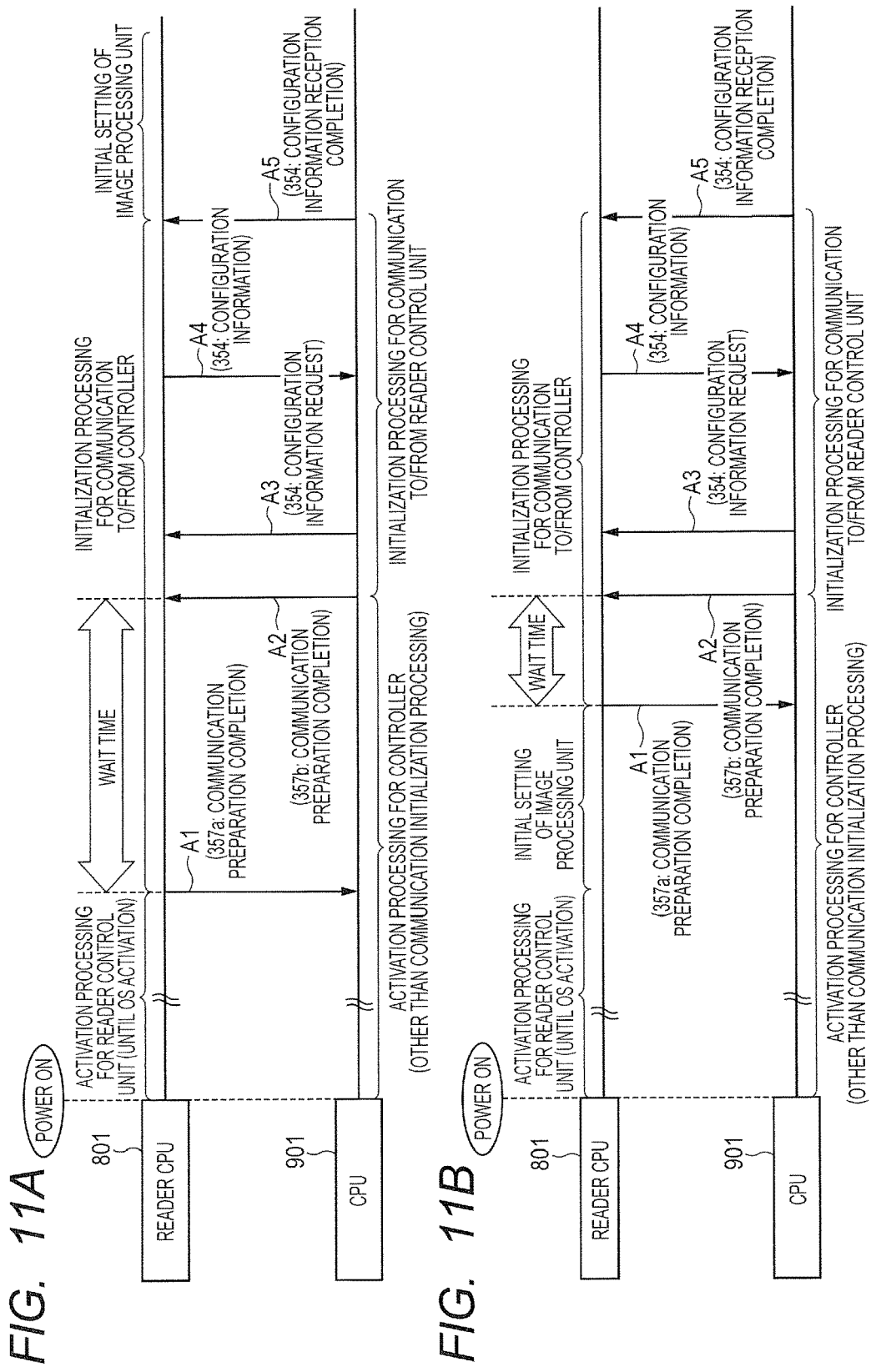

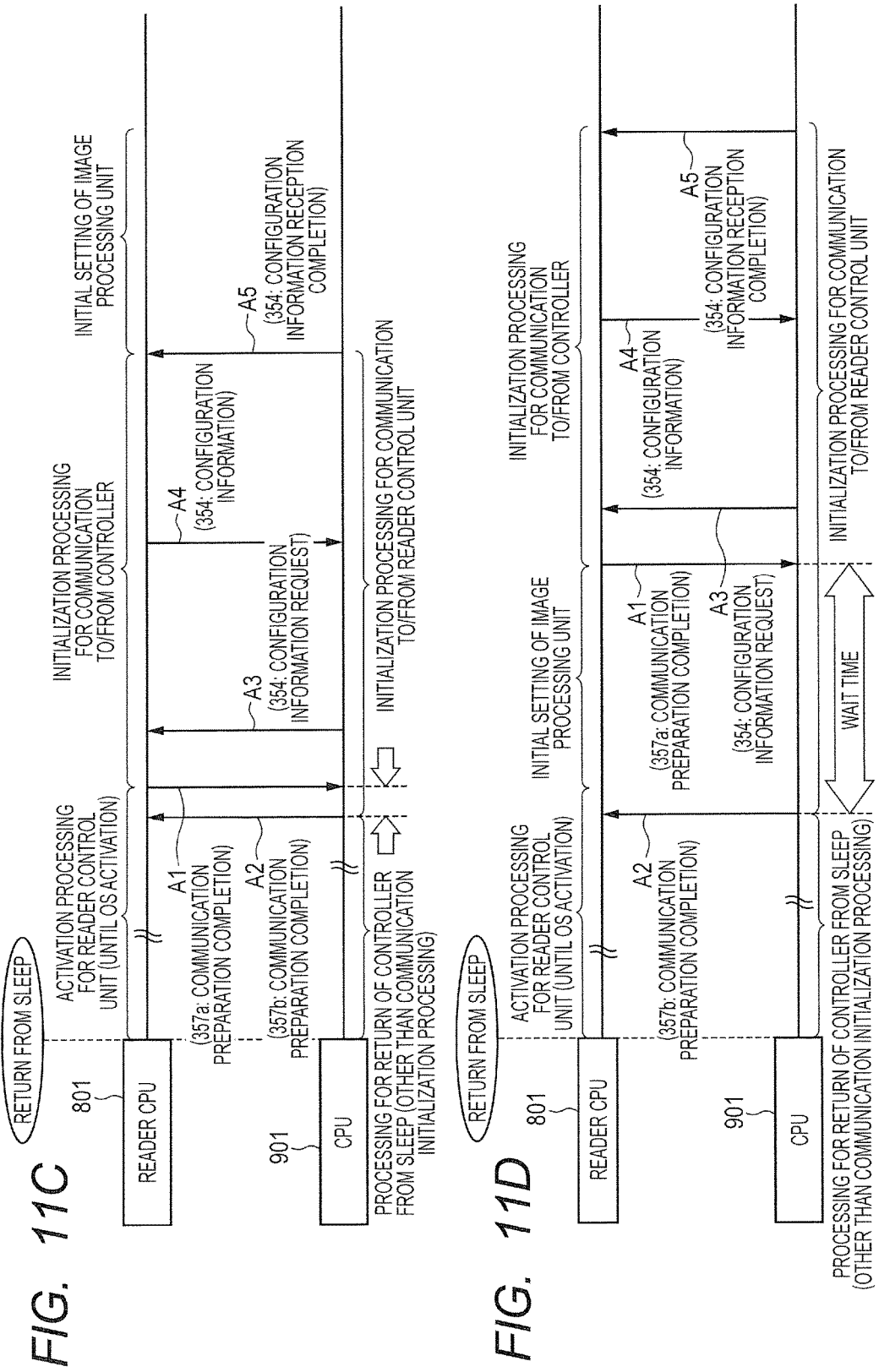

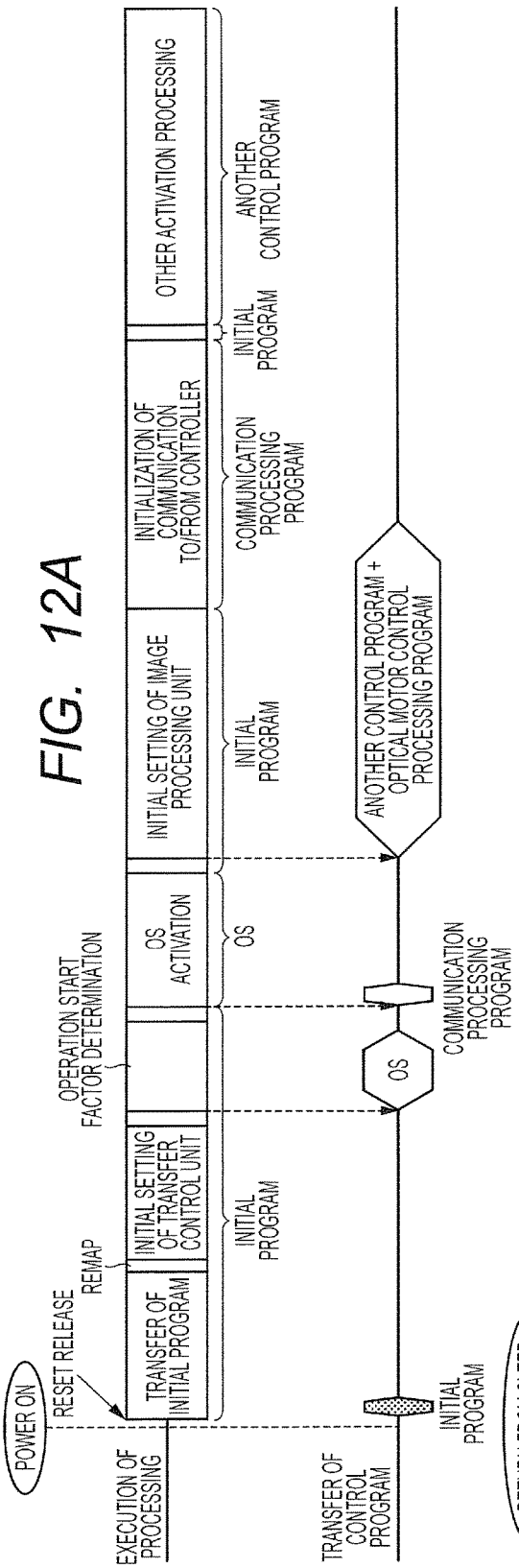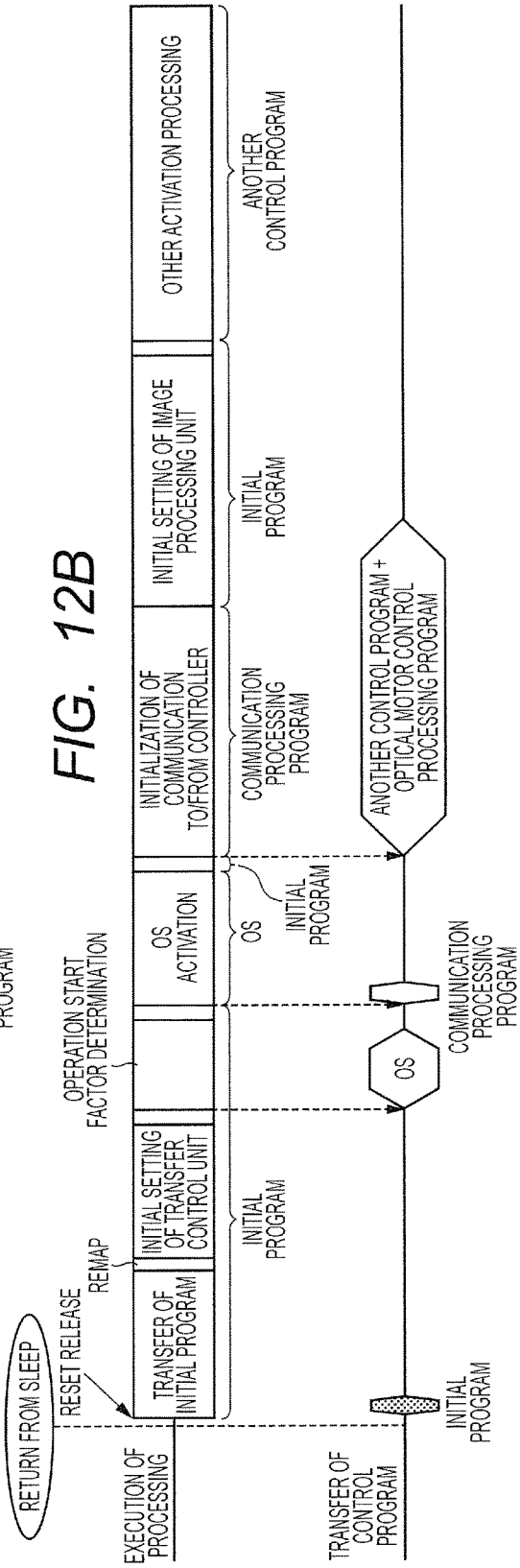

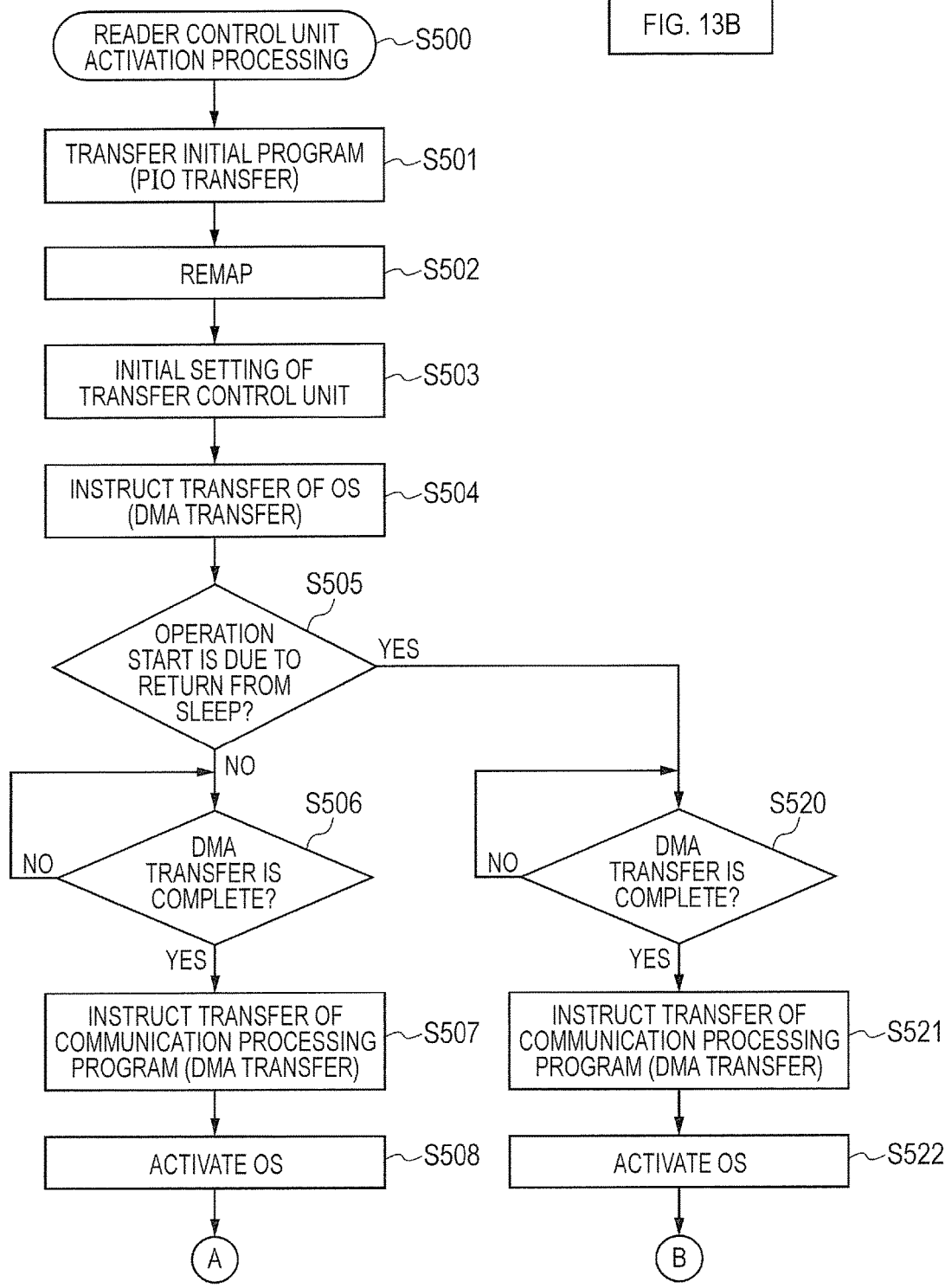

INFORMATION PROCESSING APPARATUS AND IMAGE READING APPARATUS

BACKGROUND OF THE INVENTION

Field of the Invention

The present invention relates to activation control for an image reading apparatus.

Description of the Related Art

Image processing apparatus, such as copying machines and facsimile machines, include an image reading apparatus, for example, a scanner, which is configured to obtain image data by optically reading an image of an original. In recent years, it has been desired that the first copy output time (FCOT), namely, the time taken from the issuance of an instruction to start copying until one sheet is output, be shortened, and that the processing speed in operation of the apparatus be increased. It is also desired that the time taken from the power of the image reading apparatus being turned on until the image reading apparatus is usable, namely, the time taken from the power supply being turned on until activation processing for the image reading apparatus finishes (hereinafter referred to as "activation time"), be shortened.

As a way to increase the processing speed, the read speed of control programs may be increased. Image reading apparatus include a read-only memory (ROM) and a random-access memory (RAM). The control programs are stored in the ROM, but the RAM reads data stored in its memory faster than the ROM reads data stored in its memory. Therefore, during activation of the image reading apparatus, the control programs stored in the ROM are transferred to the RAM, and after the transfer is complete, the control programs are read from the RAM for execution. As a result, compared with when the control programs are directly read from the ROM for execution, the time required to read and execute the control programs can be shortened, namely, the processing speed can be increased.

The RAM is a volatile memory, and thus, when the power supply to the RAM is stopped, the data stored in the RAM is lost. As a result, it is necessary to transfer the control programs from the ROM to the RAM each time the image reading apparatus is activated. However, when all of the control programs are transferred and then the control programs are read from the RAM for execution, compared with when the control programs are not transferred and are read from the ROM for execution, the activation time is elongated by the amount of time taken to transfer the control programs.

In Japanese Patent Application Laid-Open No. 2013-97715, there is proposed a technology for shortening the activation time by reading the control programs from the ROM for execution in parallel with transferring the control programs from the ROM to the RAM. After the transfer of the control programs is complete, the processing speed can be increased by switching the control program read destination from the ROM to the RAM.

In Japanese Patent No. 4111649, there is proposed a technology for reading and executing, in a digital camera in which a mode is specified during activation, a portion of the control programs that is shared by each mode, then determining the specified mode, and reading and executing a required portion of the control programs in accordance with the mode. More specifically, in Japanese Patent No. 4111649, when a photography mode is specified during activation, the portion of the control programs required for the photography mode is read and executed. When a playback mode is specified during activation, the portion of the control programs required for the playback mode is read and executed. With this technology, compared with reading all of the control programs, the activation time can be shortened by the time saved by not reading the portion of control programs that is unnecessary for the specified mode.

The image reading apparatus may be activated as a result of "power supply ON", in which the power supply to the whole apparatus is turned on, or as a result of "return from sleep (i.e., a non-operating state for saving power by stopping the power supply to a portion of the apparatus during a period in which the apparatus is temporarily not in use; a power-saving state)". In order to allow the user to use the apparatus more conveniently, it is necessary to increase the processing speed and shorten the activation time at the same time for both of those cases. Problems involved with increasing the processing speed while also shortening the activation time are now described below.

In the technology described in Japanese Patent Application Laid-Open No. 2013-97715, the processing speed can be increased compared with when the control programs are directly read from the ROM for execution after transfer of the control programs is complete and the control program read destination is switched from the ROM to the RAM. However, during the transfer of the control programs, namely, before the control program read destination is switched from the ROM to the RAM, the processing speed has a possibility of becoming slower conversely. The reason for this is that in the technology described in Japanese Patent Application Laid-Open No. 2013-97715, during transfer of the control programs, the transfer of the control programs from the ROM to the RAM and the reading of the control programs directly from the ROM for execution are performed in parallel. As a result, when there is a conflict between access to the ROM for transferring a control program and access to the ROM for reading and executing a control program, one of the processes has to wait.

In the technology described in Japanese Patent No. 4111649, after the power supply is turned on, first, a portion of the control programs that is shared by each mode is read. However, when the shared portion is large, the reading takes time, and the activation time is only shortened by a small amount. During activation, image reading apparatus have a "power supply ON" mode and a "return from sleep" mode. The processing that needs to be performed during activation is the same for the "power supply ON" mode and the "return from sleep" mode. As a result, the required control programs are also the same, and hence the technology described in Japanese Patent No. 4111649 cannot be applied to image reading apparatus.

SUMMARY OF THE INVENTION

The present invention has been made in order to solve the problems described above. It is an object of the present invention to provide a technology capable of shortening the time required for reading and execution of control programs even during transfer of control programs from a non-volatile memory to a volatile memory, and capable of shortening activation time from a non-operating state.

According to one embodiment of the present invention, there is provided an information processing apparatus including: a processor; a non-volatile memory configured to store control programs; and a volatile memory having a faster read speed than a read speed of the non-volatile memory, and being configured to store a first program, a second program, and a third program, wherein the processor is configured to: in a first activation processing mode, transfer the first program from the non-volatile memory to the volatile memory; transfer the second program from the non-volatile memory to the volatile memory based on the first program stored in the volatile memory; and perform, in parallel, execution of first processing based on the second program stored in the volatile memory and transfer of the third program from the non-volatile memory to the volatile memory, and in a second activation processing mode, transfer the first program from the non-volatile memory to the volatile memory; transfer the third program from the non-volatile memory to the volatile memory based on the first program stored in the volatile memory; and perform, in parallel, execution of second processing based on the third program stored in the volatile memory and transfer of the second program from the non-volatile memory to the volatile memory.

According to the present invention, the time required for the reading and execution of control programs can be shortened even during transfer of control programs from the non-volatile memory to the volatile memory, and the activation time from a non-operating state can be shortened. Therefore, the activation time from a non-operating state can be shortened when an operation start is due to the power supply being turned on as well as when the operation start is due to returning from a power-saving state.

Further features of the present invention will become apparent from the following description of exemplary embodiments with reference to the attached drawings.

BRIEF DESCRIPTION OF THE DRAWINGS

FIG. 4A is a diagram for illustrating an operation for moving an optical scanner unit to an HP.

FIG. 4B is a diagram for illustrating an operation for moving the optical scanner unit to the HP.

FIG. 6A is a diagram for illustrating a flow of communication initialization processing of a first embodiment of the present invention.

FIG. 6B is a diagram for illustrating a flow of the communication initialization processing of the first embodiment.

FIG. 6C is a diagram for illustrating a flow of the communication initialization processing of the first embodiment.

FIG. 6D is a diagram for illustrating a flow of the communication initialization processing of the first embodiment.

FIG. 7 is a flowchart of initialization processing for communication by a reader control unit.

FIG. 9A is a diagram for illustrating a flow of execution and transfer of activation processing for the reader control unit of the first embodiment.

FIG. 9B is a diagram for illustrating a flow of execution and transfer of the activation processing for the reader control unit of the first embodiment.

FIG. 11A is a diagram for illustrating a flow of communication initialization processing of a second embodiment of the present invention.

FIG. 11B is a diagram for illustrating a flow of the communication initialization processing of the second embodiment.

FIG. 11C is a diagram for illustrating a flow of the communication initialization processing of the second embodiment.

FIG. 11D is a diagram for illustrating a flow of the communication initialization processing of the second embodiment.

FIG. 12A and FIG. 12B are diagrams for illustrating a flow of execution and transfer of activation processing for the reader control unit of the second embodiment.

DESCRIPTION OF THE EMBODIMENTS

A configuration example of an image reading apparatus according to an embodiment of the present invention is now described with reference to the drawings.

[First Embodiment]

<Configuration of Image Reading Apparatus>

Figure 1:
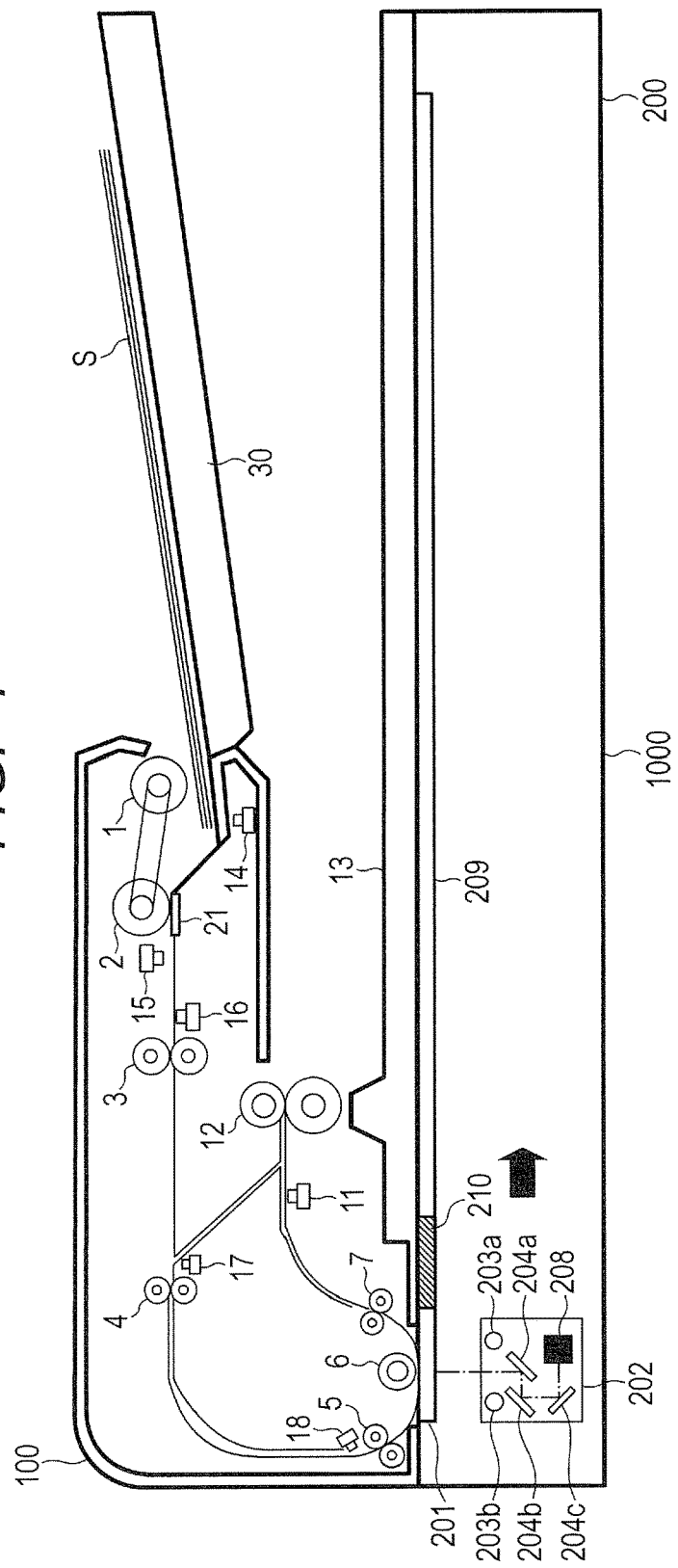
FIG. 1 is a cross-sectional diagram of an image reading apparatus.

FIG. 1 is a cross-sectional diagram for illustrating an example of a configuration of an image reading apparatus according to a first embodiment of the present invention.

As illustrated in FIG. 1, an image reading apparatus 1000 includes an image reading unit (hereinafter referred to as "reader") 200 configured to read an image of an original and an automatic original feeding unit (hereinafter referred to as "ADF") 100. A controller 300 (see FIG. 2) is connected to the image reading apparatus 1000. The abbreviation ADF stands for automatic document feeder.

(Configuration of Reader 200)

Operation of the reader 200 is now described with reference to FIG. 1.

The reader 200 is configured to scan, by an optical scanner unit 202 serving as a scanning unit, an original placed on an original table glass 209 at a fixed speed in a sub-scanning direction indicated by the arrow of FIG. 1. As a result, image information recorded on the original is read. This reading method is hereinafter referred to as "fixed reading".

The reader 200 is configured to move the optical scanner unit 202 so that the original on the ADF 100 is at a center position of a read roller 6 of the ADF 100, and to read image information recorded on the fed and conveyed original. This reading method is hereinafter referred to as "flow reading".

A shading whiteboard 210 is a whiteboard for creating reference data of a white level based on shading. Immediately before reading of the original, the reference data is created by reading the shading whiteboard 210 and performing image processing. The reading of the shading whiteboard 210 and the creation of the reference data are performed after input by the user of an instruction to read the original, and before reading of the original.

As an exception, the reading of the shading whiteboard 210 and the creation of the reference data can be performed in advance. In such a case, the optical scanner unit 202 is moved to the reading start position of the original. Then, when an instruction to read the original is input by the user within a predetermined time period (e.g., 15 seconds), reading of the original starts immediately. This enables the FCOT to be shortened. When an instruction to read the original is not input within the predetermined time period, the reference data created in advance is not used. After an instruction to read the original is input by the user in the normal manner, reading of the shading whiteboard 210 and creation of the reference data are again performed before reading of the original. Those operations are performed because the reference data is no longer reliable due to the elapse of time.

The reading of the image information is performed based on the following method. This method is the same for fixed reading, flow reading, and reading of the shading whiteboard 210.

A reader CPU 801 (see FIG. 2) for controlling the reader 200 (i.e., reading unit) is configured to turn on, under a state in which the optical scanner unit 202 is positioned below the original or the shading whiteboard 210, light-emitting diodes (LEDs) 203a and 203b to illuminate the surface of the original or shading whiteboard 210. Light reflected from the surface hits and is reflected by mirrors 204a, 204b, and 204c, and arrives at an image reading sensor 208. The image reading sensor 208 is configured to read the image information line by line based on the reflected light as an input.

(Configuration of ADF 100)

Operation of the ADF 100 is now described with reference to FIG. 1.

The ADF 100 includes an original tray 30 on which an original stack S of one or more original sheets is stacked, a separation pad 21 and a separation roller 2 for regulating, before the start of conveyance of an original, the original stack S from protruding from the original tray 30 and advancing further downstream, and a sheet feeding roller 1. The sheet feeding roller 1 is configured to be lowered down onto and rotate on an original surface of the original stack S stacked on the original tray 30, which causes the topmost original of the original stack to be fed. The originals fed by the sheet feeding roller 1 are separated into single sheets by the action of the separation roller 2 and the separation pad 21. This separation is achieved by a known technology.

The original separated by the separation roller 2 and the separation pad 21 is conveyed to registration rollers 4 by drawing rollers 3, and is pressed against the registration rollers 4, which are still not being driven. As a result, a loop-shaped bulge is formed in the original, and skew in the conveyance of the original is resolved. A feeding path for conveying the original that has passed the registration rollers 4 in the direction of a flow reading glass 201 is arranged on a downstream side of the registration rollers 4.

The original sent to the feeding path is conveyed to an image reading position by read upstream rollers 5. The original passes between the flow reading glass 201 and the read roller 6. At this stage, the image information recorded on the original is optically read line-by-line (i.e., is flow read) by the image reading sensor 208 at an original reading position directly below the read roller 6. The original, which has been conveyed by read downstream rollers 7, is conveyed to a delivery tray 13 by delivery rollers 12. When there are a plurality of originals on the original tray 30, the feeding from the original stack S, the separation of the original, the conveyance processing, the reading processing at the original reading position, and the delivery processing are each repeated until the final original has been read and delivered to the delivery tray 13. An original detection sensor 14 is arranged on the original tray 30, which enables the presence of an original on the original tray 30 to be determined.

<Configuration of Control Unit of Image Reading Apparatus 1000>

Figure 2:
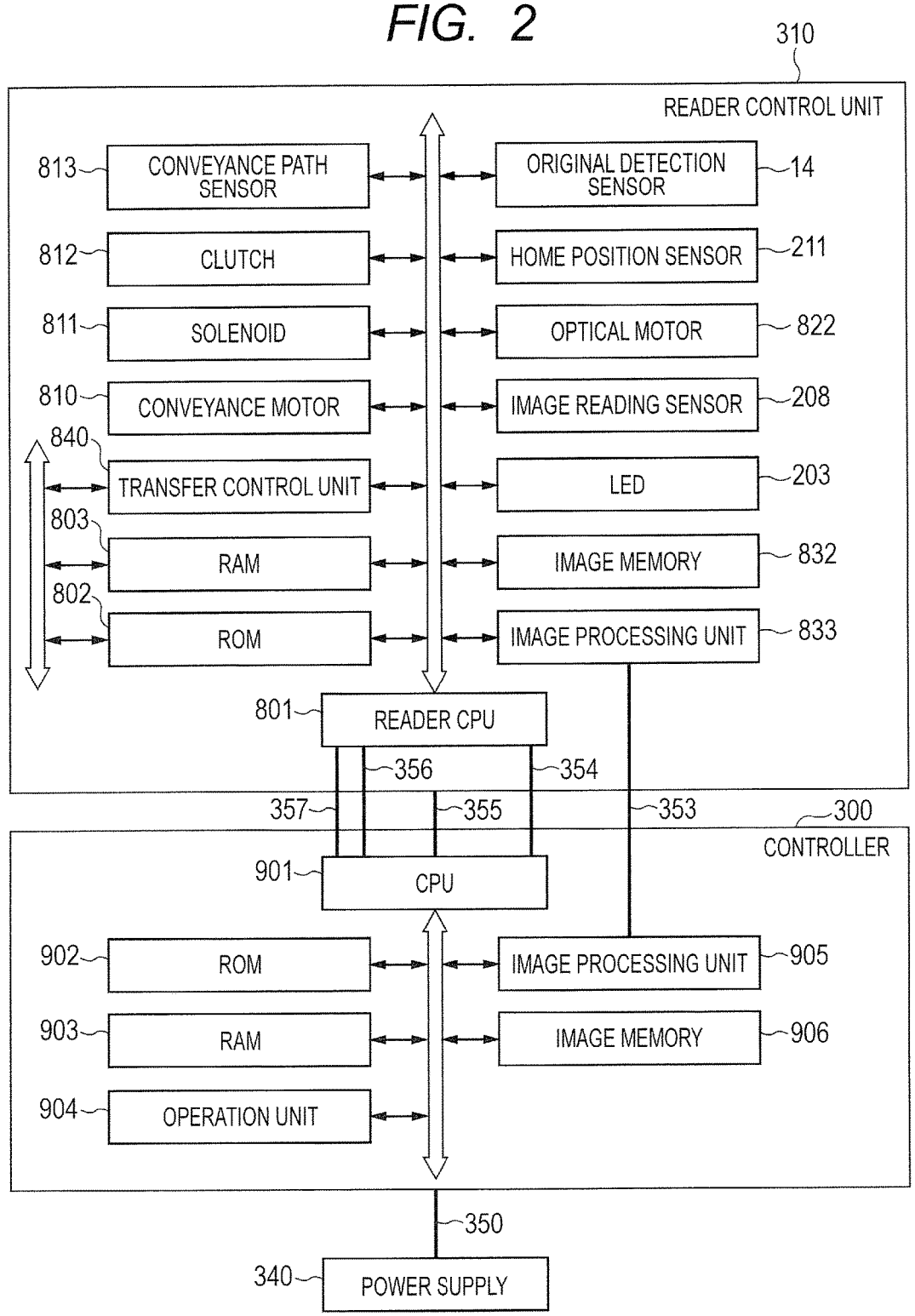
FIG. 2 is a block diagram of a control unit of the image reading apparatus.

FIG. 2 is a block diagram for illustrating an example of a control unit of the image reading apparatus 1000.

First, an information processing apparatus (hereinafter referred to as "reader control unit") 310 is described.

The reader control unit 310 is configured to control operation of the reader 200 and the ADF 100. The reader control unit 310 includes an image reading CPU (hereinafter referred to as "reader CPU") 801, which is a central processing unit, a ROM 802, and a RAM 803. The ROM 802 is configured to store control programs for the reader control unit 310. The RAM 803 is configured to store, in addition to input data and work data, control programs for the reader control unit 310 that have been transferred from the ROM 802.

In order to achieve an original conveyance function, the reader CPU 801 (i.e., processor) is connected to a conveyance motor 810, which is configured to drive the various types of conveyance rollers, a solenoid 811, a clutch 812, conveyance path sensors 813, which are various types of sensor to be used to control original conveyance, and an original detection sensor 14.

In order to achieve an image reading function, the reader CPU 801 is connected to the LEDs 203, the image reading sensor 208, an optical motor 822 for causing the optical scanner unit 202 to move in a sub-scanning direction, and a home position sensor (hereinafter referred to as "HP sensor") 211.

The reader CPU 801 can manage the position of the optical scanner unit 202 as information by managing and controlling a drive pulse number of rotation of the optical motor 822. The image data read by the image reading sensor 208 is temporally stored in an image memory 832 via an image processing unit 833. The image processing unit 833 is configured to perform image processing on the image data read by the image reading sensor 208.

A transfer control unit 840 (i.e., direct memory access controller) configured to control data transfer is connected to the reader CPU 801. The transfer control unit 840 is, for example, a direct memory access (DMA) controller for controlling DMA transfer. The reader CPU 801 specifies information on the transfer by the transfer control unit 840, and instructs the transfer control unit 840 to start the transfer. As a result, the transfer control unit 840 can transfer control programs from the ROM 802 to the RAM 803. The transfer by the transfer control unit 840 is performed using a dedicated access bus for the transfer control unit 840 that is different from the access bus for the reader CPU 801. As a result, the reader CPU 801 is not involved in the transfer processing per se. More specifically, the reader CPU 801 can perform other processing while the transfer control unit 840 is controlling transfer of the data. For example, even during data transfer by the transfer control unit 840, the reader CPU 801 can read control programs from the RAM 803 for execution.

In the first embodiment, the transfer control unit 840 is a DMA controller, and DMA transfer is used for the transfer of the control programs from the ROM 802 to the RAM 803. However, the present invention is not limited to this. Any configuration may be employed, as long as the transfer of data can be performed independently of the reader CPU 801 based on control by the transfer control unit 840, and other processing can be performed while the transfer control unit 840 is transferring the data without the reader CPU 801 conflicting with the transfer processing.

Next, the controller 300 is described.

The controller 300 is configured to control the whole image reading apparatus 1000. The controller 300 includes a CPU 901 (i.e., processor), a ROM 902, and a RAM 903. The ROM 902 is configured to store control programs for the controller 300. The RAM 903 is configured to store, in addition to input data and work data, control programs for the controller 300 transferred from the ROM 902.

The controller 300 is configured to receive, via an image line 353, which connects between the image processing unit 833 and an image processing unit 905, from the reader control unit 310 image data stored in the image memory 832. The received image data is subjected to various types of filter processing by the image processing unit 905, and then stored in an image memory 906.

The controller 300 is configured to transmit and receive control commands and control data relating to image reading control to/from the reader control unit 310 via a communication line 354 arranged between the CPU 901 and the reader CPU 801. For example, the CPU 901 receives an output by the original detection sensor 14 from the reader CPU 801. The CPU 901 determines whether or not the original stack S is stacked on the original tray 30 based on the received output by the original detection sensor 14.

A power supply 340 is connected to the controller 300. The controller 300 is configured to operate by receiving a supply of power from the power supply 340 via a power supply line 350. The CPU 901 is configured to control the supply of power in the controller 300. For example, the CPU 901 stops the supply of power when switching to a sleep (i.e., power-saving) mode.

Specifically, when switching to a state (power-saving state) in which power is supplied only to a portion of units, for example, the CPU 901, and is not supplied to other units, the CPU 901 stops the supply of power to the ROM 902, the image processing unit 905, and the image memory 906.

The power supplied via the power supply line 350 is supplied to the reader control unit 310 via a reader power supply line 355 connected to the CPU 901 and the reader control unit 310. The CPU 901 is configured to control the supply of power to the reader control unit 310 via the reader power supply line 355.

For example, when the power supply to the apparatus is turned on, the CPU 901 is activated first, and the supply of power to the reader control unit 310 is controlled by the CPU 901. When switching to the sleep mode, the CPU 901 stops the supply of power to the reader control unit 310. The CPU 901 also controls the supply of power when returning from the sleep mode, namely, when restarting the supply of power to a portion of the apparatus, including the reader control unit 310, to which the supply of power had been stopped.

The controller 300 is configured to notify, when returning from the sleep mode, the reader control unit 310 of the return from the sleep mode via a return-from-sleep notification line 356 arranged between the CPU 901 and the reader CPU 801. As a result, the reader control unit 310 can determine whether or not operation has started due to power supply ON or due to return from sleep.

The controller 300 is configured to notify, during activation, the reader control unit 310 of communication preparation completion via a communication preparation completion notification line 357 arranged between the CPU 901 and the reader CPU 801. The reader control unit 310 is also configured to notify the controller 300 of communication preparation completion via the communication preparation completion notification line 357.

The controller 300 includes an operation unit 904 as an operation display unit. An interface with the user is controlled by the CPU 901 via the operation unit 904.

<Description of Processing Performed During Operation Stop and During Operation Start by Image Reading Apparatus 1000>

In the first embodiment, the image reading apparatus 1000 has two non-operating states, namely, "power supply OFF" and "sleep". In the "power supply OFF" state, power to the whole image reading apparatus 1000 is stopped. In the "sleep" state (i.e., power-saving state), power is supplied to only a portion of the units, which is a control circuit, for example, the CPU 901, and is not supplied to the other units. Starting operation from the "power supply OFF" state is referred to as "power supply ON". Starting operation from the "sleep" state is referred to as "return from sleep". "Power supply ON" and "return from sleep" are collectively referred to as an "operation start". Further, shifting from an operating state to a non-operating state ("power supply OFF" or "sleep") is referred to as an "operation stop".

The processing for the controller 300 and the reader control unit 310 performed when the image reading apparatus 1000 stops operation and when the image reading apparatus 1000 starts operation is now described with reference to FIG. 2.

(Operation Stop for Controller 300: Power Supply OFF)

During "power supply OFF", after the processing for stopping operation, the supply of power to the whole image reading apparatus 1000 is stopped. When a "power supply OFF" instruction is input from the user via the operation unit 904, the CPU 901 transmits a "power supply OFF" command to the reader CPU 801 via the communication line 354, and instructs the reader control unit 310 to stop operation. Next, the CPU 901 performs processing for turning off the power supply of the controller 300. The CPU 901 receives from the reader CPU 801 an "operation stop preparation completion" command for the reader control unit 310 via the communication line 354, and stops the power supply to the reader control unit 310 via the power supply line 355. After the processing for stopping the power supply to the reader control unit 310 and the processing for turning off the power supply of the controller 300 are complete, the CPU 901 stops the supply of power to the controller 300 via the power supply line 350.

(Operation Stop for Controller 300: Sleep)

During "sleep", power is supplied to a portion of the units in the image reading apparatus 1000, including the CPU 901 and the RAM 903, but the supply of power to other units is stopped. When a "sleep" instruction has been input from the user via the operation unit 904, the image reading apparatus 1000 shifts to "sleep". The image reading apparatus 1000 may also shift to "sleep" when a setting for automatically shifting to "sleep" based on a timer in the apparatus is executed. When shifting to "sleep", the CPU 901 transmits a "sleep" command to the reader CPU 801 via the communication line 354, and instructs the reader control unit 310 to stop operation. Next, the CPU 901 performs sleep processing for the controller 300. The CPU 901 receives from the reader CPU 801 an "operation stop preparation completion" command for the reader control unit 310 via the communication line 354, and stops the power supply to the reader control unit 310 via the power supply line 355. After the processing for stopping the power supply to the reader control unit 310 and the sleep processing for the controller 300 are complete, the CPU 901 stops the supply of power to a portion of the controller 300. Specifically, the CPU 901 stops the supply of power to the ROM 902, the image processing unit 905, and the image memory 906.

(Operation Stop for Reader Control Unit 310: Power Supply OFF or Sleep)

When a "power supply OFF" or a "sleep" instruction has been input from the user via the operation unit 904, the CPU 901 transmits a "power supply OFF" or a "sleep" command to the reader CPU 801 via the communication line 354, and instructs the reader control unit 310 to stop operation. The reader CPU 801 receives the instruction to stop operation, and performs processing for stopping operation of the reader control unit 310. An example of the processing for stopping operation of the reader control unit 310 is moving the optical scanner unit 202. Specifically, when an instruction to stop operation is received and the optical scanner unit 202 is positioned at a reading start position of an original in order to shorten the FCOT, the reader control unit 310 moves the optical scanner unit 202 to a home position H (i.e., predetermined position). After the processing for stopping operation of the reader control unit 310 is complete, the reader CPU 801 transmits an "operation stop preparation completion" command to the CPU 901 via the communication line 354. Then, the CPU 901 receives the "operation stop preparation completion" from the reader CPU 801, and stops the supply of power to the reader control unit 310 via the power supply line 355.

(Operation Start for Controller 300: Power Supply ON)

In the case of power supply ON, namely, when the power supply to the image reading apparatus 1000 is turned on, power is first supplied to the CPU 901. When power is supplied to the CPU 901, the CPU 901 resets the hardware. After the reset is finished, the CPU 901 reads the control programs for the controller 300 stored in the ROM 902, and in accordance with the read control programs, executes activation processing for the controller 300. The activation processing for the controller 300 includes, for example, the following processing. The CPU 901 starts supplying power to the whole controller 300. The CPU 901 then starts supplying power to the reader control unit 310 via the power supply line 355. The CPU 901 transfers to the RAM 903 the control programs for the controller 300 stored in the ROM 902. The CPU 901 also performs initial operations that are required for an image reading system. After those processes have been performed, the CPU 901 initializes communication (i.e., sets communication) to/from the reader control unit 310. When communication initialization to/from the reader control unit 310 has ended, the CPU 901 ends the activation processing for the controller 300. When the activation processing ends, the controller 300 is in a state capable of receiving a user operation via the operation unit 904.

(Operation Start for Controller 300: Return from Sleep)

Unlike power supply OFF, during sleep, power is still supplied to the CPU 901 and the RAM 903. In particular, in the RAM 903, data stored before entering sleep is retained. Therefore, a portion of the initial operations required for an image reading system, for example, the hardware reset by the CPU 901 and the transfer to the RAM 903 of the control programs for the controller 300 stored in the ROM 902, becomes unnecessary. When the CPU 901 receives, during sleep, some kind of return-from-sleep request, the CPU 901 executes return-from-sleep processing for the controller 300. An example of a return-from-sleep request is input by the user on the operation unit 904. The return-from-sleep processing for the controller 300 includes, for example, the following processing. The CPU 901 starts the supply of power to the ROM 902, the image processing unit 905, and the image memory 906, to which the supply of power had been stopped during sleep. The CPU 901 starts the supply of power to the reader control unit 310 via the power supply line 355 under a state in which the reader control unit 310 has been notified of the return from sleep via the return-from-sleep notification line 356. The return-from-sleep notification line 356 is constructed from, for example, an electric signal line. When the voltage of the signal line is higher than a threshold, this indicates return from sleep. When the voltage of the signal line is lower than the threshold, this indicates power supply ON. Before starting the supply of power to the reader control unit 310, the CPU 901 increases the voltage of the return-from-sleep notification line 356 to a state higher than the threshold, and while maintaining that state, starts the supply of power to the reader control unit 310.

The CPU 901 performs, of the other initial operations that are required for an image reading system, the initial operations that are also required when returning from sleep. After those processes have been performed, the CPU 901 initializes communication to/from the reader control unit 310. When communication initialization to/from the reader control unit 310 has ended, the CPU 901 ends the return-from-sleep processing for the controller 300. When the return-from-sleep processing ends, the controller 300 is in a state capable of receiving a user operation via the operation unit 904. In the case of returning from sleep, a portion of the initial operations required for an image reading system, for example, the transfer to the RAM 903 of the control program for the controller 300 stored in the ROM 902, becomes unnecessary. As a result, compared with the activation processing for the controller 300 during power supply ON, execution of the return-from-sleep processing for the controller 300 takes less time.

(Operation Start for Reader Control Unit 310: Power Supply ON and Return from Sleep)

During power supply ON, the CPU 901 starts the supply of power to the reader control unit 310 via the power supply line 355. When the supply of power to the reader control unit 310 is started, the reader CPU 801 resets the hardware. After the reset is finished, the reader CPU 801 reads the control programs for the reader control unit 310 stored in the ROM 802, and starts activation processing for the reader control unit 310. The activation processing for the reader control unit 310 is described later. When the activation processing ends, the reader control unit 310 is in a state capable of reading an original. Unlike the controller 300, the processing to be performed by the reader control unit 310 during an operation start is the same for "power supply ON" and "return from sleep". Executing the processing in a different order during "power supply ON" from the order during "return from sleep" enables the activation time to be shortened.

<Control Programs for Reader Control Unit 310>

The reader control unit 310 is configured to execute each process based on the control programs for the reader control unit 310. Examples of reader control programs include an initial program, a real-time operating system (hereinafter referred to as "OS") (first program), a communication processing program (second program), an optical motor control processing program (third program), and other control programs. The initial program may be, for example, a program for transferring the control programs for the reader control unit 310, a program for switching a control program read destination from the ROM 802 to the RAM 803, a program for performing initial setting and issuing a transfer instruction for the transfer control unit 840, and a program for determining an operation start factor. The optical motor control processing program is a processing program for controlling a drive of the optical motor 822. The communication processing program is a processing program for controlling communication to/from the controller 300 via the communication line 354. Other control programs may be, for example, a program for controlling the conveyance motor 810 and a program for reading an original.

(Program Reading and Execution)

The control programs for the reader control unit 310 are stored in the ROM 802. The reader CPU 801 is configured to control operation of the reader 200 and the ADF 100 by reading and executing, of the control programs, the programs relevant to the processing for performing operations such as activation processing for the reader control unit 310 and original reading processing. In particular, during an operation start by the image reading apparatus 1000, of the control programs stored in the ROM 802, the reader CPU 801 reads and executes the initial program.

The ROM 802 is a non-volatile memory constructed from a flash memory, for example, and thus the recorded content is stored even when power is not supplied. The RAM 803 is a volatile memory, and hence power is required in order to store the recorded data. When power is not supplied to the RAM 803, data that has been recorded therein is lost.

The reader CPU 801 is configured to access and use the data stored in the ROM 802 and the RAM 803. The RAM 803 has a faster read speed than that of the ROM 802, and hence can access the recorded data more quickly than the ROM 802. Therefore, the processing speed can be increased by transferring the control programs from the ROM 802 to the RAM 803, and reading the control programs from the RAM 803 when executing the processing. However, the RAM 803 is a volatile memory. As a result, when activating the image reading apparatus, namely, during power supply ON or a return from sleep, it is necessary to transfer the control programs from the ROM 802 to the RAM 803 each time.

(Switching of Control Program Read Destination)

Figure 3A:
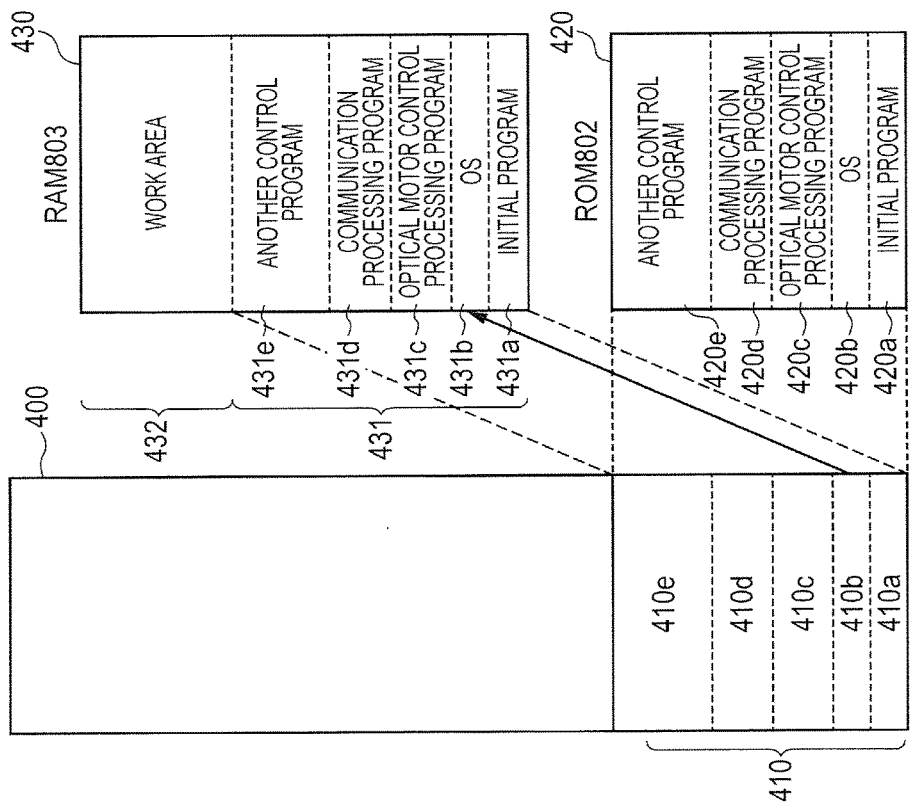
FIG. 3A is a diagram for illustrating allocation of memory in a virtual address space of a reader CPU.
Figure 3B:
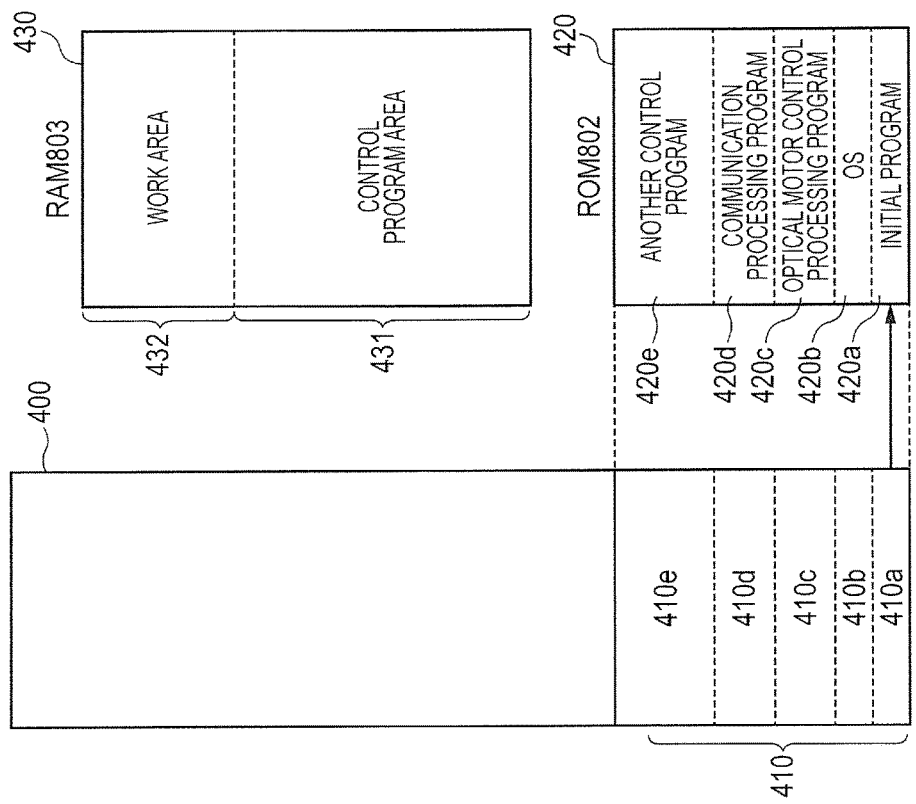
FIG. 3B is a diagram for illustrating allocation of memory in the virtual address space of the reader CPU.

The reader CPU 801 can select any one of the ROM 802 and the RAM 803 as the control program read destination for the reader control unit 310. For example, as illustrated in FIG. 3A and FIG. 3B, the conveyance motor 810 performs memory management by mapping a physical address space to a virtual address space 400. A virtual address space 410 is a portion of the virtual address space 400. The reader CPU 801 uses the virtual address space 410 as the control program read destination. The control program read destination can be changed by changing the allocation of memory in the virtual address space 410. This is now described in more detail with reference to FIG. 3A and FIG. 3B.

FIG. 3A and FIG. 3B are diagrams for illustrating allocation of memory in the virtual address space 410 of the reader CPU 801.

FIG. 3A corresponds to a case in which the ROM 802 is selected as the control program read destination. During an operation start by the image reading apparatus 1000, a physical address space 420a of the ROM 802 is allocated to a virtual address space 410a, as illustrated in FIG. 3A. In this state, when the reader CPU 801 accesses the virtual address space 410a, the physical address space 420a of the ROM 802 allocated to the virtual address space 410a is accessed. Specifically, the reader CPU 801 can read and execute the initial program by accessing the virtual address space 410a.

FIG. 3B corresponds to a case in which the RAM 803 is selected as the control program read destination, and control programs have been transferred to the RAM 803.

The RAM 803 includes a control program area for storing the control programs for the reader control unit 310 that have been transferred from the ROM 802, and a work area for storing input data and work data. The control program area corresponds to a physical address space 431, and the work area corresponds to a physical address space 432.

The act by the reader CPU 801 of changing the allocation of memory in the virtual address space 410 to the physical address space 431 for the control program area in the RAM 803 is referred to herein as "remapping".

After the control programs have been transferred from the ROM 802 to the control program area in the RAM 803, the reader CPU 801 performs remapping. This enables the reader CPU 801 to read and execute the control programs transferred from the RAM 803. For example, under the state of FIG. 3B, when the reader CPU 801 accesses the virtual address space 410b, the physical address space 431b in the RAM 803 allocated to the virtual address space 410b is accessed. Specifically, the reader CPU 801 can read the OS by accessing the virtual address space 410b.

<Method of Transferring Control Programs for Reader Control Unit 310>

For the transfer of the control programs for the reader control unit 310, transfer by the reader CPU 801 and transfer by the transfer control unit 840 are employed. Transfer of the control programs by the reader CPU 801 is referred to herein as "PIO transfer". The abbreviation "PIO" stands for program input/output. In the first embodiment, the transfer control unit 840 is a DMA controller. Therefore, transfer of the control programs by the transfer control unit 840 is referred to herein as "DMA transfer". PIO transfer and DMA transfer are described with reference to FIG. 2.

(Description of PIO Transfer)

In PIO transfer, the reader CPU 801 controls the transfer. For example, when the control programs are to be transferred from the ROM 802 to the RAM 803 by PIO transfer, first, the reader CPU 801 accesses the ROM 802 based on a transfer source address, and reads data stored in the ROM 802. Then, the reader CPU 801 accesses the RAM 803 based on a transfer destination address, and writes the data read from the ROM 802 in the RAM 803. The reader CPU 801 repeats the reading and writing of the data in accordance with the transfer size. The reader CPU 801 cannot execute other processing until the transfer of the data to be transferred is complete.

(Description of DMA Transfer)

In DMA transfer, the transfer control unit 840 controls the transfer. For example, when the control programs are to be transferred from the ROM 802 to the RAM 803 by DMA transfer, first, the reader CPU 801 performs an initial setting of the transfer control unit 840. Next, the reader CPU 801 specifies transfer information, for example, the transfer source address, the transfer destination address, and the transfer size, for the transfer control unit 840, and issues a transfer start instruction. The transfer control unit 840 receives the transfer start instruction, accesses the ROM 802 based on the specified transfer source address, and reads data stored in the ROM 802. Then, the transfer control unit 840 accesses the RAM 803 based on the specified transfer destination address, and writes the data read from the ROM 802 in the RAM 803. The transfer control unit 840 repeats the reading and writing of the data in accordance with the specified transfer size. When the transfer of the specified transfer size is finished, the transfer control unit 840 shifts to a standby state until the next transfer start instruction is received. The reader CPU 801 can determine whether or not transfer is complete by confirming the state of the transfer control unit 840. More specifically, after issuing the transfer start instruction to the transfer control unit 840, the reader CPU 801 can determine that transfer is complete when the transfer control unit 840 is in a standby state.

In the first embodiment, the determination regarding whether or not DMA transfer is complete is performed based on whether or not the transfer control unit 840 is in a standby state. However, the present invention is not limited to this. In the present invention, this determination can be performed by an arbitrary method, as long as the reader CPU 801 can determine whether or not the transfer has been completed properly. For example, the reader CPU 801 can perform control so that the processing is interrupted when the DMA transfer ends, a flag is set to ON during the interruption processing, and determine whether or not the transfer is complete based on the value of the flag.

(Parallel Processing of Control Program Transfer and Execution)

An advantage that DMA transfer has over PIO transfer is that because, in DMA transfer, the transfer is controlled by the transfer control unit 840, the reader CPU 801 can execute other processing while the transfer is being performed.

For example, of the control programs for the reader control unit 310, under a state in which the initialization program and the OS have already been transferred to the RAM 803, and the optical motor control processing program is yet to be transferred to the RAM 803, the reader CPU 801 performs remapping. The reader CPU 801 then instructs the transfer control unit 840 to start transfer of the optical motor control processing program from the ROM 802 to the RAM 803. As a result, the transfer control unit 840 transfers the optical motor control processing program from the ROM 802 to the RAM 803 by using the dedicated access bus for the transfer control unit 840. After issuing the transfer start instruction, during the period that the transfer control unit 840 is performing transfer, the reader CPU 801 can read and execute the already-transferred OS by using the access bus for the reader CPU 801 to access the RAM 803.

In this way, the transfer of the control programs by the transfer control unit 840 and the reading and execution of the control programs by the reader CPU 801 can be performed in parallel. Performing the transfer of the control programs and the reading and execution of the control programs in parallel enables the activation time for the reader control unit 310 to be shortened.

<Details of Activation Processing for Reader Control Unit 310>

The activation processing for the reader control unit 310 includes the following processing, for example.

The reader CPU 801 transfers the control programs for the reader control unit 310 stored in the ROM 802 to the RAM 803. The reader CPU 801 determines the operation start factor, namely, whether the operation start is due to power supply ON or due to return from sleep. The reader CPU 801 then activates the OS, and moves the optical scanner unit 202 to the home position H. The reader CPU 801 also initializes communication to/from the controller 300 (i.e., performs communication setting). Each of those processes is described later. In addition to the above-mentioned processing, as activation processing for the reader control unit 310, the shading whiteboard 210 for creating shading data can be read, for example.

(Transfer of Control Programs for Reader Control Unit 310)

The control programs for the reader control unit 310 are transferred from the ROM 802 to the RAM 803. In order to shorten the activation time, it is desired that the control programs be transferred by performing reading and execution of the control programs in parallel with transfer of the control programs. In order to shorten the time taken to read and execute the control programs, it is desired that the control program read destination be switched, namely, be remapped, from the ROM 802 to the RAM 803 as quickly as possible after the operation starts.

When operation starts, the reader CPU 801 reads and executes the initial program from the ROM 802. Regarding the initial program, first, a small-size control program, for example, an initial program is transferred. Because initial setting of the transfer control unit 840 has not yet been performed, PIO transfer is used for this. After transfer of the small-size control program is complete, the reader CPU 801 performs remapping to switch the program read destination. As a result, the time taken for subsequent reading and execution of the control programs can be reduced. The reader CPU 801 then performs initial setting of the transfer control unit 840. This enables DMA transfer to be performed. Therefore, the remaining control programs are transferred to the RAM 803 by subsequently performing transfer of the control programs and reading and execution of the control programs in parallel.

(Determination of Operation Start Factor)

The determination of the operation start factor is performed using, of the control programs for the reader control unit 310, the function of the initial program.

When returning from sleep, the CPU 901 starts, under a state in which the voltage of the return-from-sleep notification line 356 is maintained at a value higher than a threshold, the supply of power to the reader control unit 310 via the power supply line 355. During power supply ON, the voltage of the return-from-sleep notification line 356 is lower than the threshold. During power supply ON, the CPU 901 starts the supply of power to the reader control unit 310 without changing the voltage of the return-from-sleep notification line 356, namely, in a state in which the voltage of the return-from-sleep notification line 356 is maintained at a value lower than the threshold.

The reader CPU 801 confirms the voltage of the return-from-sleep notification line 356 in the activation processing, and when the voltage is detected as being higher than the threshold, determines that the operation start is due to return from sleep. When the voltage is detected as being lower than the threshold, the reader CPU 801 determines that the operation start is due to power supply ON.

(Activation of OS)

The OS is included in the control programs for the reader control unit 310. The processing for moving the optical scanner unit 202 to the home position H, the initialization processing for communication to/from the controller 300, other activation processing, and the original reading processing are all performed by relevant processing programs based on operation of the OS. Therefore, the reader control unit 310 activates the OS before performing those processes. Specifically, the reader control unit 310 reads and executes, of the control programs for the reader control unit 310, a kernel image included in the OS.

(Moving Optical Scanner Unit 202 to Home Position H)

The optical scanner unit 202 is moved to the home position H based on, of the control programs for the reader control unit 310, the function of the optical motor control processing program. The reader control unit 310 is configured to manage position information on the optical scanner unit 202. The position information on the optical scanner is managed in order to correctly move the optical scanner unit 202 to an operating position when reading the original and performing an operation such as reading of the shading white board 210. However, when the image reading apparatus 1000 is not operating, the optical scanner unit 202 may be unintentionally moved due to rocking and the like of the image reading apparatus 1000. Therefore, during an operation start by the image reading apparatus 1000, the reader control unit 310 cannot grasp the correct position of the optical scanner unit 202. In order to grasp the correct position of the optical scanner unit 202 during the activation processing, the reader control unit 310 moves the optical scanner unit 202 to the home position H (hereinafter referred to as "move to HP"). During the activation processing, the shading white board 210 is read in order to create shading data. Therefore, it is necessary for the optical scanner unit 202 to be moved to the HP before that processing is performed.

(Control Flow when Moving Optical Scanner Unit 202 to HP)

FIG. 4A and FIG. 4B are diagrams for illustrating operations for moving the optical scanner unit 202 to the HP.

Figure 5:
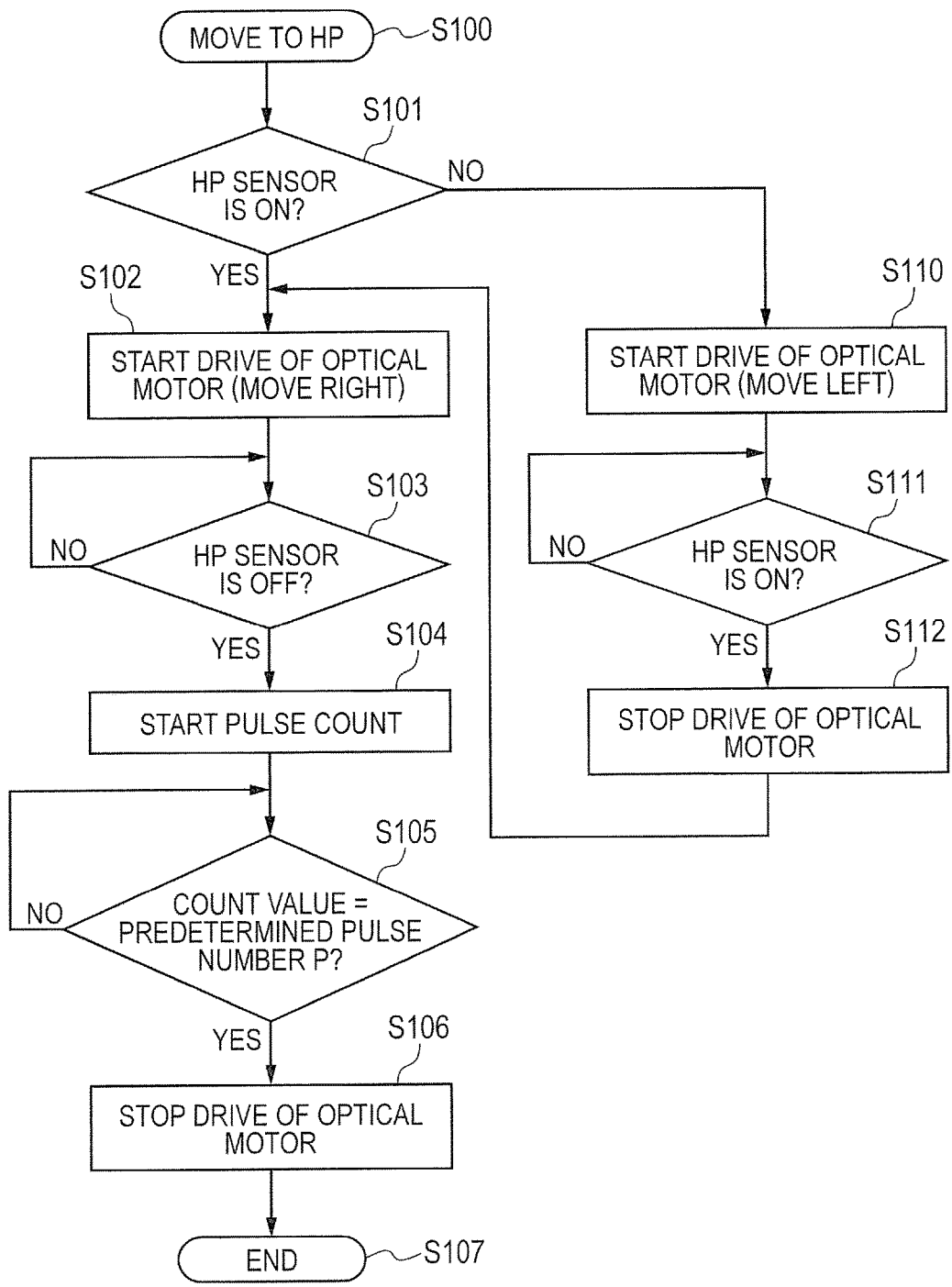
FIG. 5 is a flowchart of control processing at a time when the optical scanner unit is moved to the HP.

FIG. 5 is a flowchart for illustrating an example of control processing when moving the optical scanner unit 202 to the HP.

A control example of moving the optical scanner unit 202 to the HP is now described with reference to FIG. 4A, FIG. 4B, and FIG. 5. In the following description, the terms "left" and "right" are used based on the left/right positional relation in FIG. 4A and FIG. 4B. In the flowchart, driving the optical motor 822 to move the optical scanner unit 202 to the left is referred to as "move left", and driving the optical motor 822 to move the optical scanner unit 202 to the right is referred to as "move right".

FIG. 4A is a cross-sectional diagram for illustrating a case in which the optical scanner unit 202 has stopped at a position below the flow reading glass 201.

FIG. 4B is a cross-sectional diagram for illustrating a case in which the optical scanner unit 202 has stopped at the home position H.

A detection position B indicated by the dashed line in FIG. 4A and FIG. 4B represents the detection position of the HP sensor 211 (see FIG. 2). When the optical scanner unit 202 is positioned to the left of the detection position B, the output of the HP sensor 211 is ON. When the optical scanner unit 202 is positioned to the right of the detection position B, the output of the HP sensor 211 is OFF.

The positional relationship between the optical scanner unit 202 and the output of the HP sensor 211 are illustrated by the solid white arrows below FIG. 4A and FIG. 4B. When moving the optical scanner unit 202 to the HP, based on the point at which the output of the HP sensor 211 switches as an origin, control is performed while managing the drive pulse number of rotation of the optical motor 822. Specifically, as illustrated by the arrow in FIG. 4A, the drive pulse number of the optical motor 822 required to move from the detection position B to the home position H is a predetermined pulse P. The predetermined pulse P is stored in the RAM 803. The optical scanner unit 202 is correctly stopped at the home position H by comparing the predetermined pulse P with the actually-driven pulse number.

The control flow of moving the optical scanner unit 202 to the HP is now described with reference to FIG. 5. The processing of this flowchart is implemented by the reader CPU 801 executing the optical scanner unit control processing program.

First, in Step S101, the reader CPU 801 determines whether or not the output of the HP sensor is ON. When it is determined that the output of the HP sensor is ON (YES in Step S101), namely, when the optical scanner unit 202 is positioned to the left of the detection position B, the reader CPU 801 advances the processing to Step S102.

In Step S102, the reader CPU 801 starts the drive of the optical motor 822 to move the optical scanner unit 202 to the right. In this case, the output of the HP sensor 211 switches to OFF during the movement by the optical scanner unit 202 to the home position H.

In Step S103, the reader CPU 801 monitors, during the period that the optical scanner unit 202 is being moved, the output of the HP sensor 211, and determines whether or not the output of the HP sensor 211 has been switched to OFF. When it is determined that the output of the HP sensor 211 is still ON (NO in Step S103), the reader CPU 801 controls so that the optical scanner unit 202 continues to move.

On the other hand, when it is determined that the output of the HP sensor 211 has been switched to OFF (YES in Step S103), the reader CPU 801 advances the processing to Step S104.

In Step S104, the reader CPU 801 starts counting the drive pulse number of the optical motor 822.

Next, in Step S105, the reader CPU 801 compares the value of a predetermined pulse number P stored in the RAM 803 and the count value started in Step S104, and determines whether or not the values match. When it is determined that the values do not yet match (NO in Step S105), the reader CPU 801 controls so that the movement of the optical scanner unit 202 and the count of the drive pulse number of the optical motor 822 continue.

On the other hand, when it is determined that the value of the predetermined pulse number P and the count value match (YES in Step S105), the reader CPU 801 advances the processing to Step S106.

In Step S106, the reader CPU 801 determines that the optical scanner unit 202 has reached the home position H, stops the drive of the optical motor 822, and ends the processing of this flowchart (Step S107).

Further, in Step S101, when the reader CPU 801 determines that the output of the HP sensor 211 is OFF (NO in Step S101), namely, when the optical scanner unit 202 is positioned to the right of the detection position B, the reader CPU 801 advances the processing to Step S110.

In Step S110, the reader CPU 801 causes the optical scanner unit 202 to move left so that the optical scanner unit 202 passes above the detection position B and the output of the HP sensor 211 switches. The reader CPU 801 starts the drive of the optical motor 822 to move the optical scanner unit 202 to the left. In this case, the output of the HP sensor 211 switches to ON during the movement by the optical scanner unit 202 to the left.

In Step S111, the reader CPU 801 monitors, during the period that the optical scanner unit 202 is being moved, the output of the HP sensor 211, and determines whether or not the output of the HP sensor 211 has been switched to ON. When it is determined that the output of the HP sensor 211 is still OFF (NO in Step S111), the reader CPU 801 controls so that the optical scanner unit 202 continues to move.

When it is determined that the output of the HP sensor 211 has been switched to ON (YES in Step S111), the reader CPU 801 advances the processing to Step S112.

In Step S112, the reader CPU 801 determines that the optical scanner unit 202 has passed above the detection position B, stops the drive of the optical motor 822, and advances the processing to Step S102. In Steps S102 to S106, in the same manner as when the output of the HP sensor 211 during an operation start is ON, the reader CPU 801 moves the optical scanner unit 202 to the right to the home position H, and ends the processing of this flowchart (Step S107).

(Initialization for Communication to/from Controller 300)

Initialization for communication to/from the controller 300 is performed using, of the control programs for the reader control unit 310, the communication processing program.

The reader control unit 310 is configured to transmit and receive control commands and control data relating to image reading control to/from the controller 300 via the communication line 354. During activation processing, the reader control unit 310 and the controller 300 initialize communication by confirming that they are each in a state capable of communicating with the other via the communication line 354, and then performing initial communication. A flow of the initialization processing for communication between the reader control unit 310 and the controller 300 is now described with reference to FIG. 6A and FIG. 6B.

In each of FIG. 6A, FIG. 6B, FIG. 6C, and FIG. 6D, there is illustrated a flow of initialization processing for communication between the reader control unit 310 and the controller 300 of the first embodiment.

In each of FIG. 6A and FIG. 6B, there is illustrated an example of the processing flow of the initialization processing for communication between the reader control unit 310 and the controller 300 in the case of "power supply ON", including the processing performed before and after the initialization processing.

In each of FIG. 6C and FIG. 6D, there is illustrated an example of the processing flow of the initialization processing for communication between the reader control unit 310 and the controller 300 in the case of "return from sleep", including the processing performed before and after the initialization processing.

In the case of "power supply ON" and in the case of "return from sleep", the reader control unit 310 is configured to shift to a state capable of communicating to/from the controller 300 when activation of the OS is complete. Therefore, in FIG. 6A and FIG. 6C, the reader CPU 801 performs, of the activation processing, processing up to activation of the OS, and performs initialization processing for communication to/from the controller 300. In FIG. 6B and FIG. 6D, unlike the case in FIG. 6A and FIG. 6C, the reader CPU 801 performs, of the activation processing, processing up to activation of the OS and processing up to moving the optical scanner unit 202 to the HP, and then performs initialization processing for communication to/from the controller 300.

The processing for the controller 300 until communication can be started to/from the reader control unit 310 is different for "power supply ON" and "return from sleep".

In the case of "power supply ON", the CPU 901 performs the initial operations that are required for an image reading system, such as transfer of the control programs for the controller 300 and setting of the image processing unit 905. When those processes have been performed by the CPU 901, communication to/from the reader control unit 310 becomes possible (see FIG. 6A and FIG. 6B).

On the other hand, in the case of "return from sleep", unlike during power supply ON, several of the processes that are required for an image reading system are also performed even during sleep. Therefore, during "return from sleep", communication to/from the reader control unit 310 becomes possible after the CPU 901 has performed, of the initial operations that are required for an image reading system, such as setting of the image processing unit 905, the initial operations also required when returning from sleep (see FIG. 6C and FIG. 6D). As a result, the time required until communication to/from the reader control unit 310 becomes possible is longer for "power supply ON" than for "return from sleep". In each of those cases, when communication to/from the reader control unit 310 becomes possible, the CPU 901 initializes communication to/from the reader control unit 310.

During the initialization processing for communication between the reader control unit 310 and the controller 300, first, whether or not the reader control unit 310 and the controller 300 are in a communication-capable state to/from each other is confirmed. This confirmation is performed using the communication preparation completion notification line 357. The communication preparation completion notification line 357 is constructed from, for example, two electric signal lines. One of the two signal lines, namely, a signal line 357*a*, represents communication preparation completion for the reader control unit 310. The other of the signal lines, namely, a signal line 357*b*, represents communication preparation completion for the controller 300. The reader control unit 310 notifies the controller 300 that communication preparation is complete when the voltage of the reader control unit 310 is maintained at a higher value than a threshold, and the controller 300 notifies the reader control unit 310 that communication preparation is complete when the voltage of the controller 300 is maintained at a higher value than a threshold.

In each of FIG. 6A and FIG. 6B, there is illustrated a case in which the reader control unit 310 is in a communication-capable state earlier than the controller 300. As a result, the reader CPU 801 notifies the CPU 901 of communication preparation completion (arrow A1 in FIG. 6A and FIG. 6B), and then there is a wait time (indicated by the solid white arrow(s)) until notification by the CPU 901 of communication preparation completion (arrow A2 in FIG. 6A and FIG. 6B).

In each of FIG. 6C and FIG. 6D, there is illustrated a case in which the controller 300 is in a communication-capable state earlier than the reader control unit 310. As a result, the CPU 901 notifies the reader CPU 801 of communication preparation completion (arrow A2 in FIG. 6C and FIG. 6D), and then there is a wait time (indicated by the solid white arrow(s)) until notification by the reader CPU 801 of communication preparation completion (arrow A1 in FIG. 6C and FIG. 6D).

When the reader control unit 310 and the controller 300 are in a communication-capable state with each other, the reader CPU 801 and the CPU 901 perform initial communication using the communication line 354. In the initial communication, configuration information on the reader control unit 310 is transmitted and received. First, the CPU 901 transmits a configuration information request via the communication line 354 (arrow A3 in FIG. 6A to FIG. 6D). The reader CPU 801 receives the configuration information request, and transmits configuration information on the reader control unit 310 via the communication line 354 (arrow A4 in FIG. 6A to FIG. 6D). The configuration information on the reader control unit 310 is, for example, a version of the control program for the reader control unit 310, and an image reading range or other such function information relating to image reading. The CPU 901 receives the configuration information on the reader control unit 310, and transmits a configuration information reception completion notification via the communication line 354 (arrow A5 in FIG. 6A to FIG. 6D). The reader CPU 801 receives the configuration information reception completion notification, and then ends the communication initialization processing.

(Control Flow During Initialization Processing for Communication Between Reader Control Unit 310 and Controller 300)

Initialization processing for communication between the reader control unit 310 and the controller 300 is now described with reference to FIG. 7 and FIG. 8.

FIG. 7 is a flowchart for illustrating an example of initialization processing for communication to/from the controller 300 by the reader control unit 310.

Figure 8:
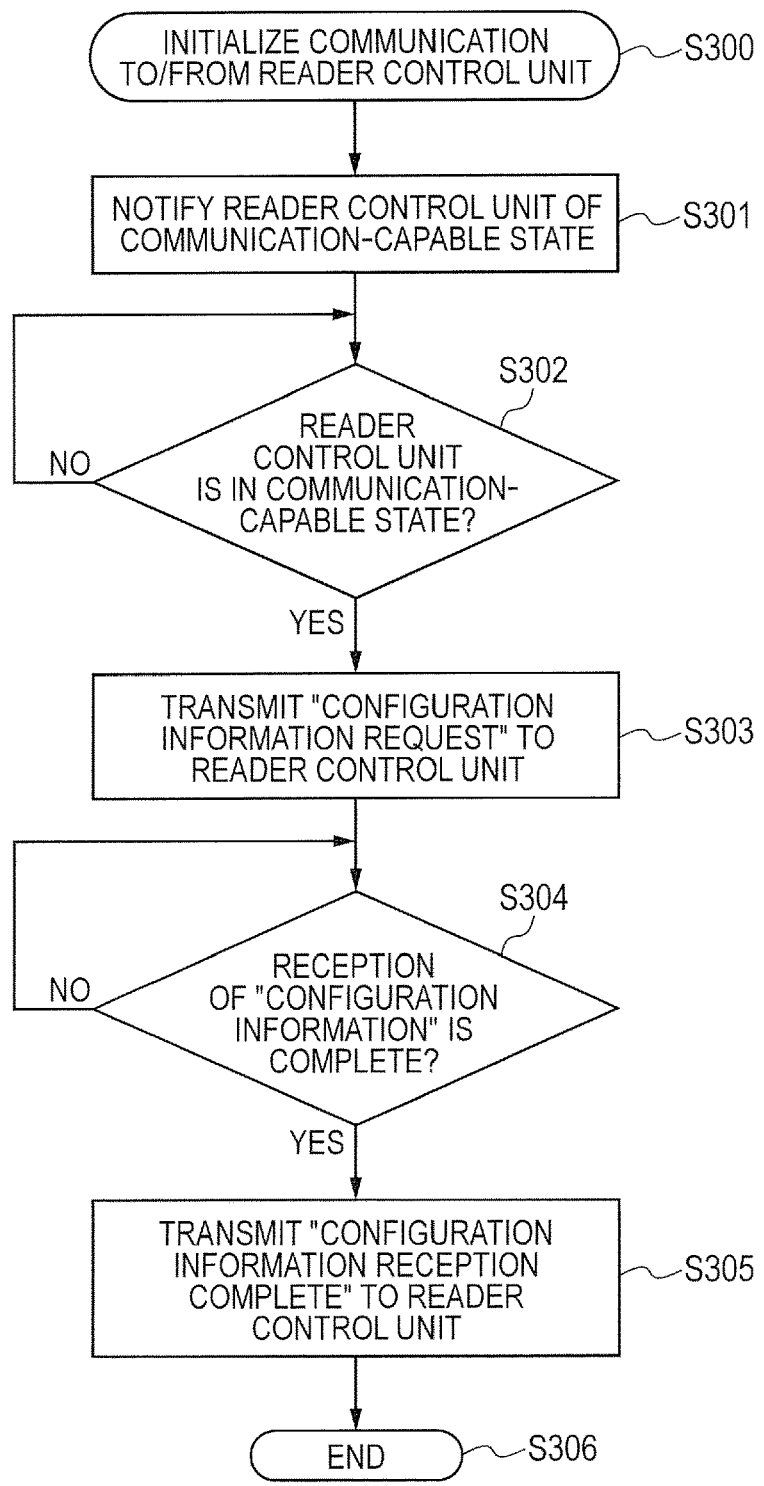
FIG. 8 is a flowchart of initialization processing for communication by a controller.

FIG. 8 is a flowchart for illustrating an example of initialization processing for communication to/from the reader control unit 310 by the controller 300.

First, a control flow of initialization processing for communication to/from the controller 300 by the reader control unit 310 is described with reference to FIG. 7. The processing of this flowchart is implemented by the reader CPU 801 executing the communication processing program.

In Step S201, first, the reader CPU 801 notifies, via the communication preparation completion notification line 357a, the controller 300 of the fact that the reader control unit 310 is in a communication-capable state.

Next, in Step S202, the reader CPU 801 checks the state of the communication preparation completion notification line 357b, and confirms whether or not the controller 300 is in a communication-capable state. When it is determined that the controller 300 is not in a communication-capable state (NO in Step S202), the reader CPU 801 repeats the confirmation of Step S202.

When it is determined that the controller 300 is in a communication-capable state (YES in Step S202), the reader CPU 801 advances the processing to Step S203.

In Step S203, the reader CPU 801 confirms whether or not a "configuration information request" command has been received from the controller 300 via the communication line 354. When it is determined that reception of the "configuration information request" command is not yet complete (NO in Step S203), the reader CPU 801 repeats the confirmation of Step S203.

When it is determined that reception of the "configuration information request" command is already complete (YES in Step S203), the reader CPU 801 advances the processing to Step S204. In Step S204, the reader CPU 801 transmits the "configuration information" data to the controller 300 via the communication line 354.

Next, in Step S205, the reader CPU 801 confirms whether or not a "configuration information reception completion" command has been received from the controller 300 via the communication line 354. When it is determined that reception of the "configuration information reception completion" command is not yet complete (NO in Step S205), the reader CPU 801 repeats the confirmation of Step S205.

When it is determined that reception of the "configuration information reception completion" command is already complete (YES in Step S205), the reader CPU 801 ends the processing of this flowchart (Step S206).

Next, a control flow of initialization processing for communication to/from the reader control unit 310 by the controller 300 is described with reference to FIG. 8. The processing of this flowchart is implemented by the CPU 901 reading and executing a program stored in the ROM 902 or the RAM 903.

In Step S301, first, the CPU 901 notifies, via the communication preparation completion notification line 357b, the reader control unit 310 of the fact that the controller 300 is in a communication-capable state.

Next, in Step S302, the CPU 901 checks the state of the communication preparation completion notification line 357a, and confirms whether or not the reader control unit 310 is in a communication-capable state. When it is determined that the reader control unit 310 is not in a communication-capable state (NO in Step S302), the CPU 901 repeats the confirmation of Step S302.

When it is determined that the reader control unit 310 is in a communication-capable state (YES in Step S302), the CPU 901 advances the processing to Step S303.

In Step S303, the CPU 901 transmits the "configuration information request" command to the reader control unit 310 via the communication line 354.

Next, in Step S304, the CPU 901 confirms whether or not "configuration information" data has been received from the reader control unit 310 via the communication line 354 (Step S304). When it is determined that reception of the "configuration information" data is not yet complete (NO in Step S304), the CPU 901 repeats the confirmation of Step S304.

When it is determined that reception of the "configuration information" data is already complete (YES in Step S304), the CPU 901 advances the processing to Step S305.

In Step S305, the CPU 901 transmits a "configuration information reception completion" command to the reader control unit 310 via the communication line 354, and ends the processing of this flowchart (Step S306).

(Reduction in Activation Time During Activation Processing for Reader Control Unit 310)

As illustrated in FIG. 6A and FIG. 6B, in the case of power supply ON, a wait time for the reader CPU 801 occurs during the communication initialization processing, and as illustrated in FIG. 6C and FIG. 6D, in the case of returning from sleep, a wait time for the CPU 901 occurs during the communication initialization processing. In the case of "power supply ON", a wait time occurs because it takes longer for the controller 300 to be in a communication-capable state to/from the reader control unit 310 than in the case of "return from sleep".

In the case of "power supply ON", as illustrated in FIG. 6B, in the activation processing for the reader control unit 310, the processing for moving the optical scanner unit 202 to the HP is performed before the initialization processing for communication to/from the controller 300. This enables the wait time for the reader control unit 310 to be shortened as compared with FIG. 6A. More specifically, the activation time for the reader control unit 310 can be reduced.

In the case of "return from sleep", as illustrated in FIG. 6D, the reader CPU 801 performs the processing for moving the optical scanner unit 202 to the HP before performing the communication initialization processing. As a result, a wait time occurs for the CPU 901 (indicated by the solid white arrow). The produced wait time is longer than the wait time for the CPU 901 represented by the solid white arrows in FIG. 6C. In other words, compared with FIG. 6C, in FIG. 6D, the activation time for the controller 300 is longer. Therefore, in the case of "return from sleep", as illustrated in FIG. 6C, during the activation processing for the reader control unit 310, the initialization processing for communication to/from the controller 300 is performed immediately after activation of the OS. As a result, compared with FIG. 6D, the activation time for the controller 300 is reduced.

When the activation time for the reader control unit 310 can be shortened, the original can be read faster. When the activation time for the controller 300 can be shortened, an original reading request operation from the user can be received faster.

Therefore, in the first embodiment, in the case of "power supply ON", as illustrated in FIG. 6B, the reader CPU 801 performs the activation processing up to activation of the OS. The reader CPU 801 performs the initialization processing for communication to/from the controller 300 after performing the processing for moving the optical scanner unit 202 to the HP. As a result, the activation time for the reader control unit 310 is shortened.

In the case of "return from sleep", as illustrated in FIG. 6C, the reader CPU 801 performs the activation processing up to activation of the OS. The reader CPU 801 performs the processing for moving the optical scanner unit 202 to the HP after performing the initialization processing for communication to/from the controller 300. As a result, the activation time for the controller 300 is shortened.

<Control Example of Activation Processing for Reader Control Unit 310>

Control during the activation processing for the reader control unit 310 is now described with reference to FIG. 9A, FIG. 9B, and FIG. 10.

In each of FIG. 9A and FIG. 9B, there is illustrated a flow of execution of activation processing for the reader control unit 310 and transfer of the control programs for the reader control unit 310 from the ROM 802 to the RAM 803 of the first embodiment. The execution of activation processing and the transfer of the control programs are performed in parallel.

Figure 10B:
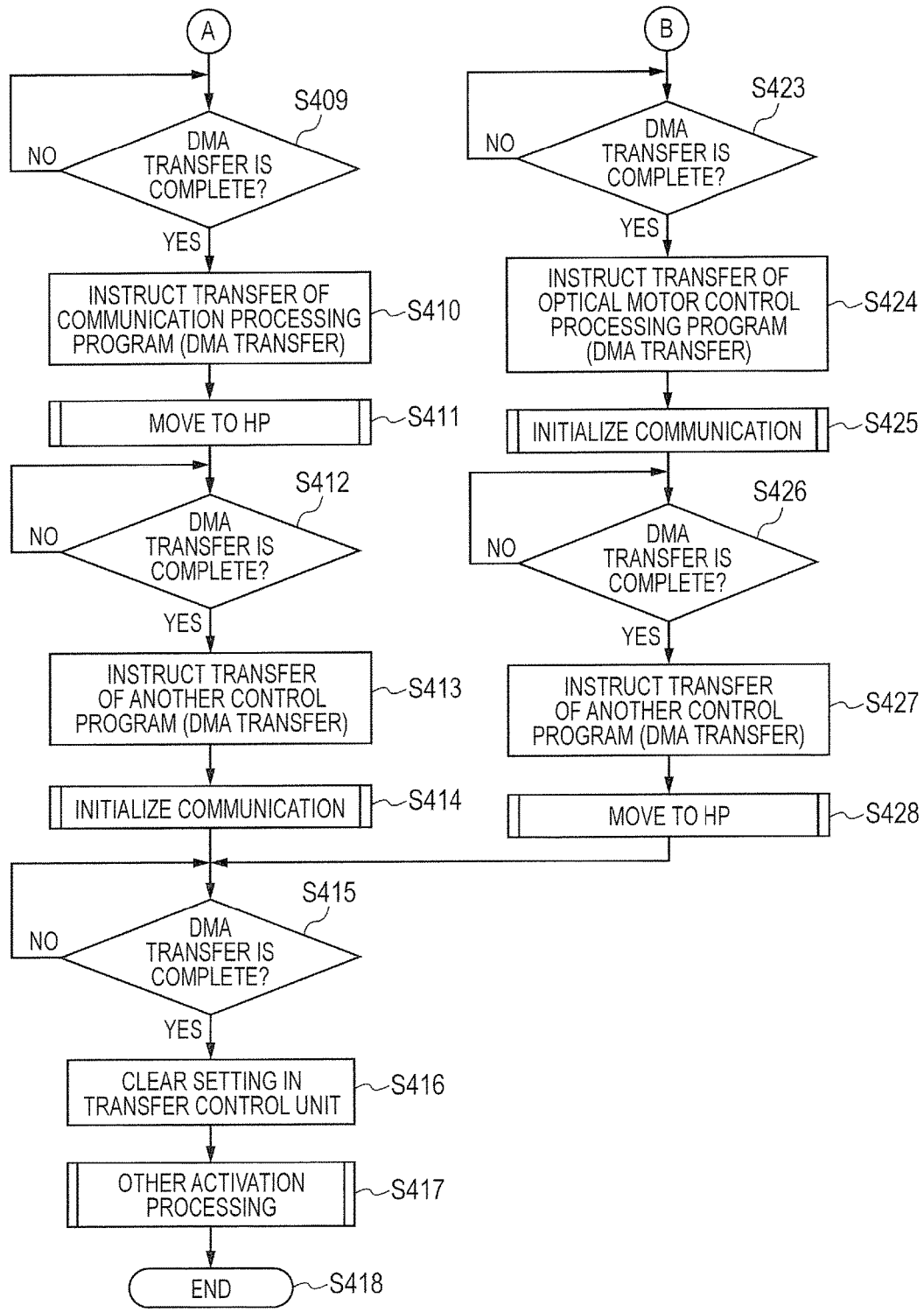
FIG. 10, which is consist of FIG. 10A and FIG. 10B, is a flowchart of the activation processing for the reader control unit of the first embodiment.

FIG. 10 is a flowchart for illustrating an example of activation processing for the reader control unit 310 of the first embodiment.

FIG. 9A corresponds to a case in which the operation start factor is "power supply ON".

FIG. 9B corresponds to a case in which the operation start factor is "return from sleep".

The upper portion of both FIG. 9A and FIG. 9B shows execution of activation processing for the reader control unit 310 performed by the reader CPU 801. In the lower part of the upper portion of both FIG. 9A and FIG. 9B, from among the control programs for the reader control unit 310, the control program that is used to perform the processing to be executed is indicated based on the name of the control program, for example, "initial program", "OS", and the like.

The lower portion of both FIG. 9A and FIG. 9B shows the transfer of the control programs for the reader control unit 310 from the ROM 802 to the RAM 803. The hatched section indicates "PIO transfer", and the non-hatched sections indicate "DMA transfer". Regarding the DMA transfer, the timing at which the reader CPU 801 specifies the transfer information and instructs the transfer start for the transfer control unit 840 is indicated by the dashed arrows from the upper portion to the lower portion in FIG. 9A and FIG. 9B.

The control flow during activation processing for the reader control unit 310 is now described with reference to FIG. 10. The processing in the flowchart of FIG. 10 is executed by the reader CPU 801.

During an operation start, the reader CPU 801 resets the hardware. After the reset is finished, the reader CPU 801 starts activation processing for the reader control unit 310 (Step S400). First, the reader CPU 801 reads and executes, of the control programs for the reader control unit 310 stored in the ROM 802, the initial program. As a result, the reader CPU 801 can perform the following processing based on that initial program.

During execution of the initial program, first, in Step S401, the reader CPU 801 transfers the initial program from the ROM 802 to the RAM 803 by PIO transfer.

Next, in Step S402, the reader CPU 801 performs remapping to switch the program read destination for the reader control unit 310 from the ROM 802 to the RAM 803. Then, the reader CPU 801 reads and executes the program transferred to the RAM 803.

Next, in Step S403, the reader CPU 801 performs initial setting of the transfer control unit 840 in order to perform DMA transfer. With the processing of Step S403, the transfer control unit 840 is in a state capable of performing DMA transfer.

Next, in Step S404, the reader CPU 801 instructs the transfer control unit 840 to transfer, of the control programs for the reader control unit 310, the OS. When that transfer instruction is complete, and DMA transfer has started, the reader CPU 801 advances the processing to Step S405.

In Step S405, in parallel with the DMA transfer instructed in Step S404, the reader CPU 801 determines whether or not the operation start factor is "power supply ON" or "return from sleep". When it is determined that the operation start factor is "power supply ON" (NO in Step S405), the reader CPU 801 advances the processing to Step S406 (i.e., second activation processing mode).

In Step S406, the reader CPU 801 determines whether or not the DMA transfer of the OS instructed in Step S404 is complete. The reader CPU 801 performs this determination by confirming the state of the transfer control unit 840. When it is determined that the DMA transfer of the OS is not complete (NO in Step S406), the reader CPU 801 repeats this confirmation until the transfer of the OS is complete.

When it is determined that the DMA transfer of the OS is complete (YES in Step S406), the reader CPU 801 advances the processing to Step S407.

In Step S407, the reader CPU 801 instructs the transfer control unit 840 to transfer the optical motor control processing program. When that transfer instruction is complete, and DMA transfer has started, the reader CPU 801 advances the processing to Step S408.

In Step S408, in parallel with the DMA transfer instructed in Step S407, the reader CPU 801 reads the OS portion of the control programs, and activates the OS. As a result of activation of the OS, the reader CPU 801 can perform processing based on the OS.

Next, in Step S409, the reader CPU 801 determines whether or not the DMA transfer of the optical motor control processing program instructed in Step S407 is complete. The reader CPU 801 performs this determination by confirming the state of the transfer control unit 840. When it is determined that the DMA transfer of the optical motor control processing program is not complete (NO in Step S409), the reader CPU 801 repeats this confirmation until the DMA transfer of the optical motor control processing program is complete.

When it is determined that the DMA transfer of the optical motor control processing program is complete (YES in Step S409), the reader CPU 801 advances the processing to Step S410.

In Step S410, the reader CPU 801 instructs the transfer control unit 840 to transfer the communication processing program. When that transfer instruction is complete, and DMA transfer has started, the reader CPU 801 advances the processing to Step S411.

In Step S411, in parallel with the DMA transfer instructed in Step S410, the reader CPU 801 reads the optical motor control processing program, executes the optical motor control processing program (i.e., performs second processing), and performs processing for moving the optical scanner unit 202 to the HP.

Next, in Step S412, the reader CPU 801 determines whether or not the DMA transfer of the communication processing program instructed in Step S410 is complete. The reader CPU 801 performs this determination by confirming the state of the transfer control unit 840. When it is determined that the DMA transfer of the communication processing program is not complete (NO in Step S412), the reader CPU 801 repeats the confirmation of Step S412 until the DMA transfer of the communication processing program is complete.

When it is determined that the DMA transfer of the communication processing program is complete (YES in Step S412), the reader CPU 801 advances the processing to Step S413.

In Step S413, the reader CPU 801 instructs the transfer control unit 840 to transfer the other control programs. When that transfer instruction is complete, and DMA transfer has started, the reader CPU 801 advances the processing to Step S414.

In Step S414, in parallel with the DMA transfer instructed in Step S413, the reader CPU 801 reads the communication processing program, executes the communication processing program, and performs initialization processing for communication to/from the controller 300. After Step S414, the reader CPU 801 advances the processing to Step S415.

In Step S415, the reader CPU 801 determines whether or not the DMA transfer of the other control programs instructed in Step S413 (or in Step S427) is complete. The reader CPU 801 performs this determination by confirming the state of the transfer control unit 840. When it is determined that the DMA transfer of the other control programs is not complete (NO in Step S415), the reader CPU 801 repeats this confirmation until the DMA transfer of the other control programs is complete.

When it is determined that the DMA transfer of the other control programs is complete (YES in Step S415), the reader CPU 801 advances the processing to Step S416.

In Step S416, the reader CPU 801 determines that transfer of all of the control programs for the reader control unit 310 is complete, and clears the setting in the transfer control unit 840.

Next, in Step S417, the reader CPU 801 reads and executes a program corresponding to other activation processing, for example, processing for reading the shading whiteboard 210 to create shading data. Then the reader CPU 801 ends the activation processing for the reader control unit of this flowchart (Step S418).

When it is determined in Step S405 that the operation start factor is "return from sleep" (YES in Step S405), the reader CPU 801 advances the processing to Step S420 (i.e., first activation processing mode).

In Step S420, the reader CPU 801 determines whether or not the DMA transfer of the OS instructed in Step S404 is complete. The reader CPU 801 performs this determination by confirming the state of the transfer control unit 840. When it is determined that the DMA transfer of the OS is not complete (NO in Step S420), the reader CPU 801 repeats the confirmation of Step S420 until the DMA transfer of the OS is complete.

When it is determined that the DMA transfer of the OS is complete (YES in Step S420), the reader CPU 801 advances the processing to Step S421.

In Step S421, the reader CPU 801 instructs the transfer control unit 840 to transfer the communication processing program. When that transfer instruction is complete, and DMA transfer has started, the reader CPU 801 advances the processing to Step S422.

In Step S422, in parallel with the DMA transfer instructed in Step S407, the reader CPU 801 reads the OS portion of the control programs, and activates the OS. As a result of activation of the OS, the reader CPU 801 can perform processing based on the OS.

Next, in Step S423, the reader CPU 801 determines whether or not the DMA transfer of the communication processing program instructed in Step S421 is complete. The reader CPU 801 performs this determination by confirming the state of the transfer control unit 840. When it is determined that the DMA transfer of the communication processing program is not complete (NO in Step S423), the reader CPU 801 repeats the confirmation of Step S423 until the DMA transfer of the communication processing program is complete.

On the other hand, when it is determined that the DMA transfer of the communication processing program is complete (YES in Step S423), the reader CPU 801 advances the processing to Step S424.

In Step S424, the reader CPU 801 instructs the transfer control unit 840 to transfer the optical motor control processing program. When that transfer instruction is complete, and DMA transfer has started, the reader CPU 801 advances the processing to Step S425.

In Step S425, in parallel with the DMA transfer instructed in Step S424, the reader CPU 801 reads the communication processing program, executes the communication processing program (i.e., first processing), and performs initialization processing for communication to/from the controller 300.

Next, in Step S426, the reader CPU 801 determines whether or not the DMA transfer of the optical motor control processing program instructed in Step S424 is complete. The reader CPU 801 performs this determination by confirming the state of the transfer control unit 840. When it is determined that the DMA transfer of the optical motor control processing program is not complete (NO in Step S426), the reader CPU 801 repeats the confirmation of Step S426 until the DMA transfer of the optical motor control processing program is complete.

When it is determined that the DMA transfer of the optical motor control processing program is complete (YES in Step S426), the reader CPU 801 advances the processing to Step S427.

In Step S427, the reader CPU 801 instructs the transfer control unit 840 to transfer the other control programs. When that transfer instruction is complete, and DMA transfer has started, the reader CPU 801 advances the processing to Step S428.

In Step S428, in parallel with the DMA transfer instructed in Step S427, the reader CPU 801 reads the optical motor control processing program, executes the optical motor control processing program, and performs processing for moving the optical scanner unit 202 to the HP. After Step S428, the reader CPU 801 advances the processing to Step S415.

From Step S415 onwards, the CPU 901 performs the same processing as in the case when the operation start factor is "power supply ON" (i.e., Steps S415 to S417), and then ends the activation processing for the reader control unit of this flowchart (Step S418).

With the control described above, the control programs are divided, transferred, and at the point when the transfer of the initial portion is finished, the control program read destination is switched from the ROM 802 to the RAM 803. As a result, during transfer of the subsequent control programs, the time taken to read and execute the control programs can be shortened.

Further, the time taken until the controller 300 is in a communication-capable state is different depending on whether the operation start factor is "power supply ON" or is "return from sleep". The transfer order of the control programs and the execution order of the activation processing for the reader control unit 310 are controlled to be changed depending on whether the operation start factor is "power supply ON" or is "return from sleep". This enables the wait time in the activation processing for the reader control unit 310 and the controller 300 to be reduced when the operation start factor is "power supply ON" as well as when the operation start factor is "return from sleep". As a result, the activation processing activation time for the reader control unit 310 and the controller 300 can be reduced.

[Second Embodiment]

An image reading apparatus 1000 according to a second embodiment of the present invention has the same hardware configuration as the first embodiment, and hence a description thereof is omitted here. In the image reading apparatus 1000 according to the second embodiment, in order to reduce the activation time, the processing for moving the optical scanner unit 202 to the HP during the activation processing is omitted. Except for the activation processing for the reader control unit 310, the processing performed during an operation stop by the image reading apparatus 1000 and the processing performed during an operation start by the image reading apparatus 1000 are the same as the first embodiment, and hence a description of such processing is omitted here. Further, the control programs for the reader control unit 310 and the transfer method of the control programs are the same as the first embodiment, and hence a description thereof is omitted here.

<Details of Activation Processing for Reader Control Unit 310>

The activation processing for the reader control unit 310 includes the transfer of the control programs for the reader control unit 310, the determination of the operation start factor, activation of the OS, and initialization of communication to/from the controller 300 of the first embodiment. Those processes are the same as the first embodiment, and thus a description thereof is omitted here.

In the second embodiment, the activation processing for the reader control unit 310 includes initial setting processing for the image processing unit 833. The initial setting processing for the image processing unit 833 is described later. In addition, as activation processing for the reader control unit 310, for example, there is reading of the shading whiteboard 210 for creating shading data.

(Initial Setting of Image Processing Unit 833)

The image processing unit 833 is constructed from, for example, an application-specific integrated circuit (ASIC). During original reading, image data of the original read by the image reading sensor 208 is subjected to image processing by the image processing unit 833, and the processed image data is stored in the image memory 832. The image processing may be, for example, when dust has adhered to the original table glass 209 or the flow reading glass 201, processing for correcting a dust portion of the read image data based on surrounding image data of the original. The image processing may also be, for example, when dust is adhered to the shading whiteboard 210, processing for correcting the dust portion of the image data of the shading whiteboard 210 read in order to create shading data. Therefore, it is necessary to perform the initial setting of the image processing unit 833 before the processing for reading the shading whiteboard 210 to create shading data.

In the second embodiment, the initial setting of the image processing unit 833 is performed by, of the control programs for the reader control unit 310, an initial program. With the initial program, the reader CPU 801 performs a predetermined setting, for example, a registration setting, so that the image processing unit 833 can operate. The initial setting of the image processing unit 833 may also be performed by a control program for the reader control unit 310 other than an initial program.

(Reduction of Activation Time During Activation Processing for Reader Control Unit 310)

In each of FIG. 11A, FIG. 11B, FIG. 11C, and FIG. 11D, there is illustrated a flow of initialization processing for communication between the reader control unit 310 and the controller 300 of the second embodiment.

In each of FIG. 11A and FIG. 11B, there is illustrated an example of the processing flow of the initialization processing for communication between the reader control unit 310 and the controller 300 in the case of "power supply ON", including the processing performed before and after the initialization processing.

In each of FIG. 11C and FIG. 11D, there is illustrated an example of the processing flow of the initialization processing for communication between the reader control unit 310 and the controller 300 in the case of "return from sleep", including the processing performed before and after the initialization processing.

In FIG. 11A and FIG. 11C, the reader CPU 801 performs, of the activation processing, processing up to activation of the OS. The reader CPU 801 performs initialization processing for communication to/from the controller 300, and then performs initial setting processing for the image processing unit 833. On the other hand, in FIG. 11B and FIG. 11D, of the activation processing, the reader CPU 801 performs processing up to activation of the OS. The reader CPU 801 also performs initial setting processing for the image processing unit 833, and then performs initialization processing for communication to/from the controller 300.

As described in the first embodiment, the controller 300 requires the longer time until communication to/from the reader control unit 310 becomes possible for "power supply ON" than for "return from sleep". Therefore, in each of FIG. 11A and FIG. 11B, there is illustrated a case in which the reader control unit 310 is in a communication-capable state earlier than the controller 300. The reader CPU 801 notifies the CPU 901 of communication preparation completion (arrow A1 in FIG. 11A and FIG. 11B), and then there is a wait time (indicated by the solid white arrow(s)) until notification by the CPU 901 of communication preparation completion (arrow A2 in FIG. 11A and FIG. 11B).

On the other hand, in each of FIG. 11C and FIG. 11D, there is illustrated a case in which the controller 300 is in a communication-capable state earlier than the reader control unit 310. As a result, the CPU 901 notifies the reader CPU 801 of communication preparation completion (arrow A2 in FIG. 11C and FIG. 11D), and then there is a wait time (indicated by the solid white arrow(s)) until notification by the reader CPU 801 of communication preparation completion (arrow A1 in FIG. 6A and FIG. 6B).

In the case of "power supply ON", as illustrated in FIG. 11B, in the activation processing for the reader control unit 310, the initial setting processing for the image processing unit 833 is performed before the initialization processing for communication to/from the controller 300. This enables the wait time for the reader control unit 310 to be shortened as compared with FIG. 11A. More specifically, the activation time for the reader control unit 310 can be reduced.

In the case of "return from sleep", as illustrated in FIG. 11C, during the activation processing for the reader control unit 310, the initialization processing for communication to/from the controller 300 is performed immediately after activation of the OS. Performing the initial setting of the image processing unit 833 after that processing enables the activation time for the controller 300 to be reduced as compared with FIG. 11D.

When the activation time for the reader control unit 310 can be shortened, the original can be read faster. When the activation time for the controller 300 can be shortened, an operation from the user can be received faster. Therefore, in the second embodiment, in the case of "power supply ON", the reader CPU 801 performs the activation processing up to activation of the OS. The reader CPU 801 performs the initialization processing for communication to/from the controller 300 after performing the initial setting processing for the image processing unit 833 (FIG. 11B). As a result, the activation time for the reader control unit 310 is shortened. In addition, in the case of "return from sleep", the reader CPU 801 performs the activation processing up to activation of the OS. The reader CPU 801 performs the initial setting processing for the image processing unit 833 after performing the initialization processing for communication to/from the controller 300 (FIG. 11C). As a result, the activation time for the controller 300 is shortened. Control during the activation processing for the reader control unit 310 is now described with reference to FIG. 12A, FIG. 12B, and FIG. 13.

<Control Example of Activation Processing for Reader Control Unit 310>

In each of FIGS. 12A and 12B, there is illustrated a flow of execution of activation processing for the reader control unit 310 and transfer of the control programs for the reader control unit 310 of the second embodiment.

Figure 13B:
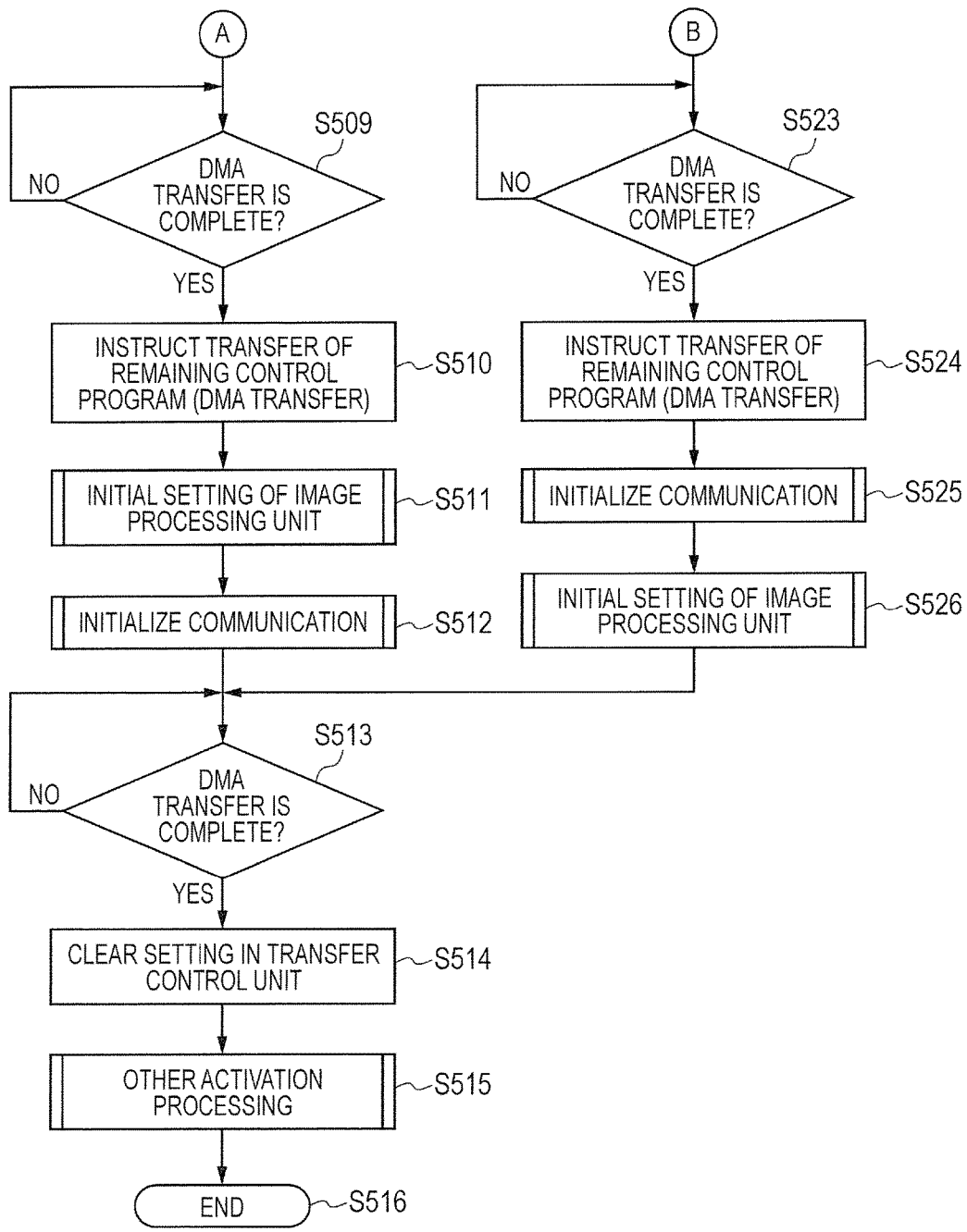
FIG. 13, which is consist of FIG. 13A and FIG. 13B, is a flowchart of the activation processing for the reader control unit of the second embodiment.

FIG. 13 is a flowchart for illustrating control of activation processing for the reader control unit 310 of the second embodiment.

FIG. 12A corresponds to a case in which the operation start factor is "power supply ON".

FIG. 12B corresponds to a case in which the operation start factor is "return from sleep".

The upper portion of both FIG. 12A and FIG. 12B shows execution of activation processing for the reader control unit 310 performed by the reader CPU 801. In the lower part of the upper portion of both FIG. 12A and FIG. 12B, from among the control programs for the reader control unit 310, the control program that is used to perform the processing to be executed is indicated based on the name of the control program, for example, "initial program", "OS", and the like.

The lower portion of both FIG. 12A and FIG. 12B shows the transfer of the control programs for the reader control unit 310 from the ROM 802 to the RAM 803. The hatched section indicates "PIO transfer", and the non-hatched sections indicate "DMA transfer". Regarding the DMA transfer, the timing at which the reader CPU 801 specifies the transfer information and instructs the transfer start for the transfer control unit 840 is indicated by the dashed arrows from the upper portion to the lower portion in FIG. 12A and FIG. 12B.

The control flow during activation processing for the reader control unit 310 is now described with reference to FIG. 13. The processing in the flowchart of FIG. 13 is all executed by the reader CPU 801.

During an operation start, the reader CPU 801 resets the hardware. After the reset is finished, the reader CPU 801 starts activation processing for the reader control unit 310 (Step S500). The processing of from Step S501 to Step 506 is the same as that of from Step S401 to Step 406 in FIG. 10, and hence a description thereof is omitted here.

In Step S507, the reader CPU 801 instructs the transfer control unit 840 to transfer the communication processing program. When that transfer instruction is complete, and DMA transfer has started, the reader CPU 801 advances the processing to Step S508.

In Step S508, in parallel with the DMA transfer instructed in Step S507, the reader CPU 801 reads the OS portion of the control programs, and activates the OS. As a result of activation of the OS, the reader CPU 801 can perform processing based on the OS.

Next, in Step S509, the reader CPU 801 determines whether or not the DMA transfer of the communication processing program instructed in Step S507 is complete. The reader CPU 801 performs this determination by confirming the state of the transfer control unit 840.

When it is determined that the DMA transfer of the communication processing program is not complete (NO in Step S509), the reader CPU 801 repeats the confirmation of Step S509 until the DMA transfer of the communication processing program is complete.

When it is determined that the DMA transfer of the communication processing program is complete (YES in Step S509), the reader CPU 801 advances the processing to Step S510.

In Step S510, the reader CPU 801 instructs the transfer control unit 840 to transfer the remaining control programs, that is, the optical motor control program and other control programs. When that transfer instruction is complete, and DMA transfer has started, the reader CPU 801 advances the processing to Step S511.

In Step S511, in parallel with the DMA transfer instructed in Step S510, the reader CPU 801 reads the initial program, executes the initial program, and performs the initial setting processing for the image processing unit 833.

Next, in Step S512, the reader CPU 801 reads the communication processing program, executes the communication processing program, and performs initialization processing for communication to/from the controller 300. After Step S512, the reader CPU 801 advances the processing to Step S513.

In Step S513, the reader CPU 801 determines whether or not the DMA transfer of the remaining control programs instructed in Step S510 (or Step S524) is complete. The reader CPU 801 performs this determination by confirming the state of the transfer control unit 840. When it is determined that the DMA transfer of the remaining control programs is not complete (NO in Step S513), the reader CPU 801 repeats the confirmation of Step S513 until the DMA transfer of the remaining control programs is complete.

When it is determined that the DMA transfer of the remaining control programs is complete (YES in Step S513), the reader CPU 801 advances the processing to Step S514. The processing of from Step S514 to Step S516 is the same as that of from Step S416 to Step 418 in FIG. 10, and hence a description thereof is omitted here.

In addition, when it is determined in Step S505 that the operation start factor is "return from sleep" (YES in Step S505), the reader CPU 801 advances the processing to Step S520. The processing of from Step S520 to Step S524 is the same as that of from Step S506 to Step 510, and hence a description thereof is omitted here.

In Step S525, in parallel with the DMA transfer instructed in Step S524, the reader CPU 801 reads the communication processing program, executes the communication processing program, and performs initialization processing for communication to/from the controller 300.

Next, in Step S526, the reader CPU 801 reads the initial program, executes the initial program, and performs the initial setting processing for the image processing unit 833. After Step S526, the reader CPU 801 advances the processing to Step S513.

From Step S513 onwards, the reader CPU 801 performs the same processing as in the case when the operation start factor is "power supply ON" (i.e., Steps S513 to S514), and then ends the activation processing for the reader control unit of this flowchart (Step S516).

With the control described above, the second embodiment has the same effects as the first embodiment.

There is described above a configuration in which the processing for determining whether or not the operation start factor is power supply ON or return from sleep is included in an initial program, but the determination processing may be included in another control program.

In each of the embodiments described above, there is described an example of activation control for an image reading apparatus. However, the activation control of the present invention is not limited to activation control for an image reading apparatus, and the present invention may be applied to activation control for various other kinds of electronic devices as well.

In this way, the time required for the reading and execution of control programs can be shortened even during transfer of control programs from a non-volatile memory to a volatile memory, and the activation time from a non-operating state can be shortened during an operation start due to the power supply being turned on as well as during an operation start due to returning from a power-saving state.

The structure and the content of the various kinds of data described above are not limited to the examples described above. Various structures and content may be employed for the data in accordance with the intended application and purpose.

Several embodiments of the present invention are described above, but the present invention may also be embodied as, for example, a system, an apparatus, a method, a program, or a storage medium. Specifically, the present invention may be applied in a system constructed from a plurality of devices, or applied in an apparatus constructed from a single device.

The present invention also includes any combination of the embodiments described above.

[OTHER EMBODIMENTS]

Embodiments of the present invention can also be implemented by one or more processors in a computer of a system or apparatus reading out and executing a program that performs the functions of one or more of the above-mentioned embodiments of the present invention, which is supplied to the system or apparatus via a network or storage medium. Embodiments of the present invention can also be implemented by a circuit (e.g., ASIC) that performs one or more functions.

The present invention can also be applied in a system constructed from a plurality of devices, or in a system constructed from a single device Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the above-mentioned embodiments, and various modifications (including an organic combination of the embodiments) may be made thereto based on the spirit of the present invention without departing from the scope of the present invention. In other words, all configurations obtained by combining the above-mentioned embodiments and modification examples thereof are encompassed by the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-241828, filed Dec. 14, 2016, which is hereby incorporated by reference herein in its entirety.

What is claimed is:

1. An information processing apparatus, comprising:
a first processor;
a non-volatile memory configured to store control programs; and
a volatile memory having a faster read speed than a read speed of the non-volatile memory, and being configured to store a first program, a second program, and a third program,
wherein the first processor is configured to:
in a first activation processing mode,
transfer the first program from the non-volatile memory to the volatile memory;

transfer the second program from the non-volatile memory to the volatile memory based on the first program stored in the volatile memory; and perform, in parallel, execution of first processing based on the second program stored in the volatile memory and transfer of the third program from the non-volatile memory to the volatile memory, and in a second activation processing mode, transfer the first program from the non-volatile memory to the volatile memory;

transfer the third program from the non-volatile memory to the volatile memory based on the first program stored in the volatile memory; and perform, in parallel, execution of second processing based on the third program stored in the volatile memory and transfer of the second program from the non-volatile memory to the volatile memory, wherein the first processor is configured to communicate to and from a controller, wherein, in the first activation processing mode, the information processing apparatus is activated from a state in which power is being supplied to a second processor of the controller, and wherein, in the second activation processing mode, the information processing apparatus is activated from a state in which power is not being supplied to the second processor of the controller.

2. An information processing apparatus according to claim 1, further comprising a direct memory access controller, wherein the second processor is configured to:

transfer the first program from the non-volatile memory to the volatile memory without using the direct memory access controller, and transfer the second program and the third program from the non-volatile memory to the volatile memory by using the direct memory access controller.

3. An information processing apparatus according to claim 1, wherein the second program includes a program for controlling communication to and from the controller.

4. An information processing apparatus according to claim 1, wherein the first program includes an initial program.

5. An information processing apparatus according to claim 1, wherein the first program includes a real-time operating system.

6. An image reading apparatus, comprising:

a reading unit configured to read image information recorded on an original;

a first processor configured to control the reading unit;

a non-volatile memory configured to store control programs;

a volatile memory having a faster read speed than a read speed of the non-volatile memory, and configured to store a first program, a second program, and a third program; and a controller configured to control the image reading apparatus, wherein the first processor is configured to:

in a first activation processing mode, transfer the first program from the non-volatile memory to the volatile memory;

transfer the second program from the non-volatile memory to the volatile memory based on the first program stored in the volatile memory; and perform, in parallel, execution of first processing based on the second program stored in the volatile memory and transfer of the third program from the non-volatile memory to the volatile memory, and in a second activation processing mode, transfer the first program from the non-volatile memory to the volatile memory;

transfer the third program from the non-volatile memory to the volatile memory based on the first program stored in the volatile memory; and perform, in parallel, execution of second processing based on the third program stored in the volatile memory and transfer of the second program from the non-volatile memory to the volatile memory, wherein the first processor is configured to communicate to and from the controller, wherein, in the first activation processing mode, the image reading apparatus is activated from a state in which power is being supplied to a second processor of the controller, and wherein, in the second activation processing mode, the image reading apparatus is activated from a state in which power is not being supplied to the second processor of the controller.

7. An image reading apparatus according to claim 6, further comprising a direct memory access controller, wherein the first processor is configured to:

transfer the first program from the non-volatile memory to the volatile memory without using the direct memory access controller, and transfer the second program and the third program from the non-volatile memory to the volatile memory by using the direct memory access controller.

8. An image reading apparatus according to claim 6, wherein the second program includes a program for controlling communication to and from the controller.

9. An image reading apparatus according to claim 6, wherein the first program includes an initial program.

10. An image reading apparatus according to claim 6, wherein the first program includes a real-time operating system.

11. A method of controlling an information processing apparatus including a first processor operable in a first activation processing mode and a second activation processing mode, the first processor being configured to communicate to and from a controller, a non-volatile memory configured to store control programs, and a volatile memory having a faster read speed than a read speed of the non-volatile memory, and being configured to store a first program, a second program, and a third program, the method comprising:

activating, in the first activation processing mode, the information processing apparatus from a state in which power is being supplied to a second processor of the controller;

controlling, in the first activation processing mode, the first processor to:

transfer the first program from the non-volatile memory to the volatile memory;

transfer the second program from the non-volatile memory to the volatile memory based on the first program stored in the volatile memory; and perform, in parallel, execution of first processing based on the second program stored in the volatile memory and transfer of the third program from the non-volatile memory to the volatile memory;

activating, in the second activation processing mode, the information processing apparatus from a state in which power is not being supplied to the second processor of the controller; and controlling, in the second activation processing mode, the first processor to:
  transfer the first program from the non-volatile memory to the volatile memory;
  transfer the third program from the non-volatile memory to the volatile memory based on the first program stored in the volatile memory; and
  perform, in parallel, execution of second processing based on the third program stored in the volatile memory and transfer of the second program from the non-volatile memory to the volatile memory.

* * * * *